(12) United States Patent
Chilakamarri et al.

(10) Patent No.: US 12,717,656 B2
(45) Date of Patent: Aug. 25, 2026

(54) INTEGRATING AND CATALOGUING APPLICATION PROGRAMMING INTERFACES FOR NETWORK ENVIRONMENTS

(71) Applicant: CITIBANK, N.A., New York, NY (US)

(72) Inventors: Jaya C. Chilakamarri, Irving, TX (US); David R. Charles, Irving, TX (US); Usha S. Yellapu, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/626,836

(22) Filed: Apr. 4, 2024

(65) Prior Publication Data

US 2024/0385915 A1 Nov. 21, 2024

Related U.S. Application Data

(60) Provisional application No. 63/467,201, filed on May 17, 2023.

(51) Int. Cl.
*G06F 9/54* (2006.01)
*G06F 11/34* (2006.01)

(52) U.S. Cl.
CPC .............. *G06F 9/541* (2013.01); *G06F 9/547* (2013.01); *G06F 11/3409* (2013.01)

(58) Field of Classification Search
None
See application file for complete search history.

(56) References Cited

U.S. PATENT DOCUMENTS 10,133,650 B1 11/2018 Park et al.
10,362,141 B1 7/2019 Thompson et al.
10,956,244 B1 3/2021 Cho
11,281,462 B1 * 3/2022 Manzano ................ G06F 9/547
11,570,261 B1 1/2023 Dutra et al.
11,824,745 B1 * 11/2023 Coimbatore ............ H04L 67/56

(Continued)

OTHER PUBLICATIONS

International Search Report and Written Opinion issued in International Application No. PCT/US2024/029362 dated Sep. 10, 2024 (5 Pages).

(Continued)

*Primary Examiner* — Umut Onat
(74) *Attorney, Agent, or Firm* — Foley & Lardner LLP

(57) ABSTRACT

Presented herein are system and methods for integrating application programming interfaces (APIs) for use in network environments. A service of an API management platform may receive, from an administrator device, a request to deploy an API for use in a network environment among one or more applications. The request may include a specification defining the API according to a template for a domain of a plurality of domains. The service may identify, from a plurality of policies corresponding to the plurality of domains, a policy based on the domain for the template with which the specification of the request is defined. The service may determine that the API is validated in accordance with the policy for the domain. The service may generate an indication of approval of the API for use in the network environment among the one or more applications, responsive to determining that the API is validated.

18 Claims, 14 Drawing Sheets

(56) References Cited

U.S. PATENT DOCUMENTS

| | | | | |
|---|---|---|---|---|
| 2014/0164449 | A1 | 6/2014 | Kim et al. | |
| 2015/0271296 | A1 | 9/2015 | Borzycki et al. | |
| 2016/0057107 | A1* | 2/2016 | Call | H04L 63/02 726/11 |
| 2018/0018186 | A1 | 1/2018 | Tammineni et al. | |
| 2018/0152356 | A1* | 5/2018 | Dhariwal | H04L 41/40 |
| 2018/0314622 | A1* | 11/2018 | Lowe | G06F 11/3616 |
| 2019/0163459 | A1 | 5/2019 | Sreenivasa et al. | |
| 2019/0213057 | A1 | 7/2019 | Nitta | |
| 2020/0267238 | A1* | 8/2020 | Gupta | G06F 21/44 |
| 2020/0409931 | A1 | 12/2020 | Zang et al. | |
| 2021/0084040 | A1* | 3/2021 | Sakowicz | H04L 63/1425 |
| 2021/0406383 | A1 | 12/2021 | Ahuja | |
| 2022/0334892 | A1* | 10/2022 | Godwin | G06F 9/547 |
| 2022/0414548 | A1* | 12/2022 | Ashrafzadeh | G06F 18/25 |
| 2023/0081153 | A1 | 3/2023 | Boguslavsky et al. | |
| 2023/0088970 | A1 | 3/2023 | O'Dell et al. | |
| 2023/0106091 | A1* | 4/2023 | Shivashankara | G06F 9/541 719/328 |
| 2023/0128866 | A1 | 4/2023 | Bhattacharyya | |
| 2023/0171243 | A1* | 6/2023 | Peddada | H04L 61/4505 726/7 |
| 2023/0333917 | A1* | 10/2023 | Lowe | G06F 8/60 |
| 2023/0409417 | A1* | 12/2023 | Kanvar | G06F 9/547 |
| 2024/0193249 | A1* | 6/2024 | Li | G06F 21/44 |

OTHER PUBLICATIONS

Final Office Action on U.S. Appl. No. 18/626,911 Dtd Dec. 20, 2024.

* cited by examiner

460

Home / Gateway123
Run Review Release

EXECUTE

Search 465 470 475 480

| SP ID | API Name | Request Status | Basepath Conversion | Template Selection | OPA Result | Results | ☐ WH1 | ☐ WH2 | ☐ Create PR | ☐ Merge PR |
|---|---|---|---|---|---|---|---|---|---|---|
| | | | | | | | Actions | | | |
| 6465 | AccountManagement | Reviewer to be Assigned | | Template-1 | | | ☐ | ☐ | ☐ | ☐ |
| 6463 | IITFundTransfer_Retail_Domain_IOS | Submitted | | Template-2 | | | ☐ | ☐ | ☐ | ☐ |
| 6462 | IITFundTransfer_Retail_Domain | Submitted | | Template-2 | | | ☐ | ☐ | ☐ | ☐ |
| 6461 | LinkedAccountFundsTransfer_Retail_Orchestration_IOS | Submitted | | Template-4 | | | ☐ | ☐ | ☐ | ☐ |
| 6460 | LinkedAccountFundsTransfer_Retail_Orchestration | Submitted | | Template-4 | | | ☐ | ☐ | ☐ | ☐ |
| 6454 | RiskAssessment | Proxy Bundle Generated | Fully Converted | Template-3 | | | ☐ | ☐ | ☐ | ☐ |
| 6451 | Acquisitions_StraightThroughProcessGateway_Wealth_View_Listener | Review in Progress | | | | | ☐ | ☐ | ☐ | ☐ |
| 6448 | CreditCardApplicationProcess_CrossLob_Domain | Proxy Bundle Generated | | Template-5 | | | ☐ | ☐ | ☐ | ☐ |

FIG. 4C

INTEGRATING AND CATALOGUING APPLICATION PROGRAMMING INTERFACES FOR NETWORK ENVIRONMENTS

CROSS REFERENCE TO RELATED APPLICATIONS

The present application claims the benefit of priority under 35 U.S.C. § 119(e) to U.S. Provisional Application No. 63/467,201, titled "Governing APIs with Intelligence," filed May 17, 2023, which is incorporated herein in its entirety by reference.

TECHNICAL FIELD

This application generally relates to application programming interfaces (APIs), and in particular, integrating and cataloguing APIs for use in network environments.

BACKGROUND

One application may communicate with another application via an API. The API may include a set of rules and protocols to allow different applications to exchange data and interact with one another. Software developers may use the specified rules and protocols to access the functionality and data of one application from another application. There may be, however, several hinderances to adapting APIs. For instance, there may be inconsistencies in the API rules or protocols, with varying naming conventions, endpoints, and formats. In another example, documentation for APIs may be incomplete, outdated, or lacking, resulting in such APIs being unusable to the software developers. These and other hinderances may be even more exacerbated with the use of a myriad of APIs in network environments used by a multitude of users.

SUMMARY

APIs may provide optionality to control access to data across a wide range of applications in a network environment (e.g., an organization or enterprise network or a cloud computing network), allowing developers to rapidly update applications to changing utilization and demands. Without proper management of the APIs, however, the entire network environment may be exposed through the APIs to security risks and other faults, such as data exfiltration or unauthorized access to various resources. Furthermore, the adoptions of various APIs may eventually result in a sprawl of several APIs, with redundant APIs with overlapping functionalities, outdated API documentation, or orphan APIs without clear managing entity, among others. Another challenge may include lack of interoperability or interfacing with records regarding the APIs available for use in the network.

API governance may be used to manage and administer the creation, deployment, and usage of APIs within complex network environments, addressing some of these challenges. The API governance may define a set of processes and policies to ensure that APIs are defined, deployed, and used in a consistent and secure manner by the applications and services in the network environments. There may be, however, a number of challenges in effectively enacting API governance. First, the API governance may lack any centralized system of record, resulting in ambiguities in API ownership and specifications and inadequate quality of API metadata. Second, there may be a lack of specific controls management, leading to frequent breaches in API controls, residual risks, and unauthorized use or access off sensitive information, among others. Third, the API governance may be deficient in lifecycle management through the entirety of the use of a given API, from development, deployment, versioning, and deprecation.

To address these and other technical challenges, a centralized service for an API management platform may validate, test, integrate, and monitor APIs through their lifecycle, by categorizing and aligning API specifications and identifying any redundancies and deprecations of APIs. The service may be a part of the network environment or separate from the network environment. The service may function as a single source of knowledge about APIs in the given network environment with the use of a robust API catalogue. By active monitoring metadata and performance metrics of the APIs from the network, the service may update API records and update versioning. During the onboarding process, the service may also provide for codified controls and automated review. Through the lifecycle of a given API, the service may provide for automation and tooling for management, as well as observability into usage and analytics.

In registering an API, the service may provide a dashboard interface for an administrator device to submit a request for review of an API for a given domain (e.g., a type of function or application). The dashboard interface may include a set of fields for the administrator to enter information about the API, in accordance with a template for the given domain. The template may ensure that the API specifications are standardized and consistent. Upon submission through the dashboard interface, the service may select a policy against which to check the new API. With the selection, the service may perform validation and performance tests on the API. The service may generate a score card indicating which validation and performance tests the submitted API has passed or failed. With the generation, the service may provide the score card for presentation on the dashboard interface. This may allow the administrator or developer to revise the APIs using the score card provided on the dashboard. Until the API passes, the service may prohibit incorporation of the API into the network environment. One the API passes the tests, the service may approved for use in the networked environment.

With the incorporation of the API for use, the service may add the specification of the API to the API catalogue for the network environment. The service may monitor for metadata associated with the API from a variety of data sources, including usage by applications and services within the network environment and revisions by the administrator through the API management platform, among others. Using the metadata, the service may update the corresponding record in the API catalogue for the API. For example, the service may identify whether a given version is in use or deprecated, when the metadata indicates a lack or reduction in usage of the API. The service may also determine whether there are redundancies with APIs by comparison the metadata across the APIs for similar functionality and usage. The service may calculate various performance metrics using the metadata associated with the API. The information derived from the metadata may be stored and maintained on the API catalogue.

Through the dashboard interface, the administrator device may submit a query for APIs from the API catalogue on the centralized service. With receipt, the service may search the API catalogue using the keywords of the query to find one or more APIs. The service may return an identification of the APIs for presentation on the dashboard interface on the administrator device. The service may also provide information derived from the metadata with the APIs, such as whether the version is in use, an indication of redundancy in function with another API, and performance analytics, among others, for the dashboard interface. This may allow the administrator or developer to have insight on the usage of APIs within the network environment.

In this manner, the service for an API management platform may provide for centralized records of APIs available for use in the network environment, thereby alleviating or eliminating issues surrounding API sprawl. The use of templates for API specifications may ensure consistencies and standardization. By controlling integration of APIs into the network environment, the service may further ensure that the API specification are successfully validated and tested prior to the integration. The continuous monitoring by the service may allow for lifecycle management of the APIs from development, deployment, versioning, and deprecation. The centralized catalogue may also provide a consistent and standardized information about APIs as well as performance metrics of the APIs used in the network environment. With the improvement in the API governance for the network environment, the computing resources and network bandwidth of the servers and clients in the network environment may be more efficiently allocated. Furthermore, new APIs may be deployed in a standard and consistent manner, thereby increasing the adaptation of newer functionality in the network environment.

Aspects of the present disclosure are directed to systems, methods, and non-transitory computer readable media for integrating application programming interfaces (APIs) for use in network environments. A service of an API management platform may receive, from an administrator device, a request to deploy an API for use in a network environment among one or more applications. The request may include a specification defining the API according to a template for a domain of a plurality of domains. The service may identify, from a plurality of policies corresponding to the plurality of domains, a policy based on the domain for the template with which the specification of the request is defined. The service may determine that the API is validated in accordance with the policy for the domain. The service may generate an indication of approval of the API for use in the network environment among the one or more applications, responsive to determining that the API is validated. The service may store, on a database of the API management platform, an association between the specification of the API and the indication of approval to permit use of the API in the network environment.

In one embodiment, the service may determine that a second API is not validated in accordance with the policy for the domain. The service may generate a second indication of disapproval of the second API for use in the network environment among the one or more applications, responsive to determining that the second API is not validated. The service may store, on the database, an association between the second API and the second indication of disapproval to restrict use of the second API in the network environment. In another embodiment, the service may provide, for presentation via a user interface on the administrator device, the second indication of disapproval of the second API for use in the network environment among the one or more applications. In yet another embodiment, the service may determine that the second API is not validated in accordance with at least one of a subset of policies for the domain. The service may identify, from the subset of policies, a second policy under which the API is not validated, while the API is validated under a remainder of the subset of policies. The service may generate the second indication identifying the second policy under which the API is not validated.

In yet another embodiment, the service may provide, for presentation on the administrator device, a user interface comprising a plurality of user interface elements to accept information for defining the API in accordance with the template for the domain. The service may receive the request including the specification generated using the information accepted via one or more of the plurality of user interface elements of the user interface presented on the administrator device. In yet another embodiment, the service may determine that the API satisfies a functionality criterion based on testing of the API defined by the specification. The service may generate the indication further comprises generating the indication of approval, responsive to determining (i) that the API is validated and (ii) that the API satisfied the functionality criterion.

In yet another embodiment, the service may determine that the API is validated further comprises determining that the API is validated in accordance with all of a subset of policies for the domain. The service may generate a validation score based determining that the API is validated in accordance with one or more of the subset of policies. In yet another embodiment, the service may provide, for presentation via a user interface on the administrator device, the indication of approval of the API for use in the network environment among the one or more applications. In yet another embodiment, the service may maintain, on the database, a plurality of templates for the corresponding plurality of domains to define APIs. Each domain of the plurality of domains may define a respective type of application for the APIs. In yet another embodiment, the service may perform an integration on the API to be used by the one or more applications of the network environment, responsive to storing the association on the database.

Aspects of the present disclosure are directed to systems, methods, and non-transitory computer readable media for cataloguing application programming interfaces (APIs) using metadata. A service may be associated with an API management platform. The service may maintain, a plurality of records on a database. Each record of the plurality of records may identify a respective API of a plurality of APIs approved in use in a network environment among one or more applications. The service may retrieve, for at least one API of the plurality of APIs, metadata identifying at least one of (i) usage of the at least one API from the network environment or (ii) modification of a specification of the at least one API via the API management platform. The service may update, on the database, a respective record of the plurality of records for the at least one API using the metadata. The service may receive, from an administrator device, a query including one or more keywords to select one or more of the plurality of records on the database. The service may select from the plurality of records on the database, the respective record identifying the at least one API based on the one or more keywords of the query and the metadata associated with the at least one API. The service may transmit, to the administrator device, a response identifying the respective record for the at least one API.

In one embodiment, the service may generate a plurality of performance metrics for the at least one API, using the metadata identifying usage of the at least one API in the network environment. The service may provide, for presentation via a user interface on an administrator device, the plurality of performance metrics for the at least one API. In another embodiment, the service may determine that the at least one API is redundant with a second API of the plurality of APIs based on metadata of the at least API and second metadata of the second API. The service may update the respective record to indicate that the at least one API is redundant with the second API.

In yet another embodiment, the service may determine that a first version of the at least one API is deprecated based on the usage of the first version of the at least one API in the network environment below a threshold. The service may update the respective record to indicate that the version of the at least one API is deprecated. In yet another embodiment, the service may identify, from a plurality of classification, a classification for the at least one API based on the metadata. The service may update the respective record to identify the classification for the least one API.

In yet another embodiment, the service may generate a graph identifying a plurality of nodes and a plurality of edges using the metadata associated with the at least one API. Each of the plurality of nodes may correspond to a respective element of the metadata. Each of the plurality of edges may define a relationship between a corresponding pair of nodes of the plurality of nodes. The service may update the respective record to include the graph for the at least one API. In yet another embodiment, the service may maintain the plurality of records each identifying at least one of a plurality of domains under which the respective API is approved for use in the network environment. The service may receive the query identifying a domain of the plurality of domains. The service may select the at least one record based on the domain identified in the query.

In yet another embodiment, the service may receive, via a user interface from the administrator device, the query generated using information accepted via one or more user interface elements of the user interface presented on the administrator device. In yet another embodiment, the service may provide, for presentation via a user interface on the administrator device, an identification corresponding to the respective record for the at least one API. In yet another embodiment, the service associated with the API management platform may reside in at least one of: (i) within the network environment or (ii) outside the network environment.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

FIG. 4C illustrates a screenshot of a user interface for indicating results of validation and testing of application programming interfaces (APIs), in accordance with an embodiment;

DETAILED DESCRIPTION

Figure 1:
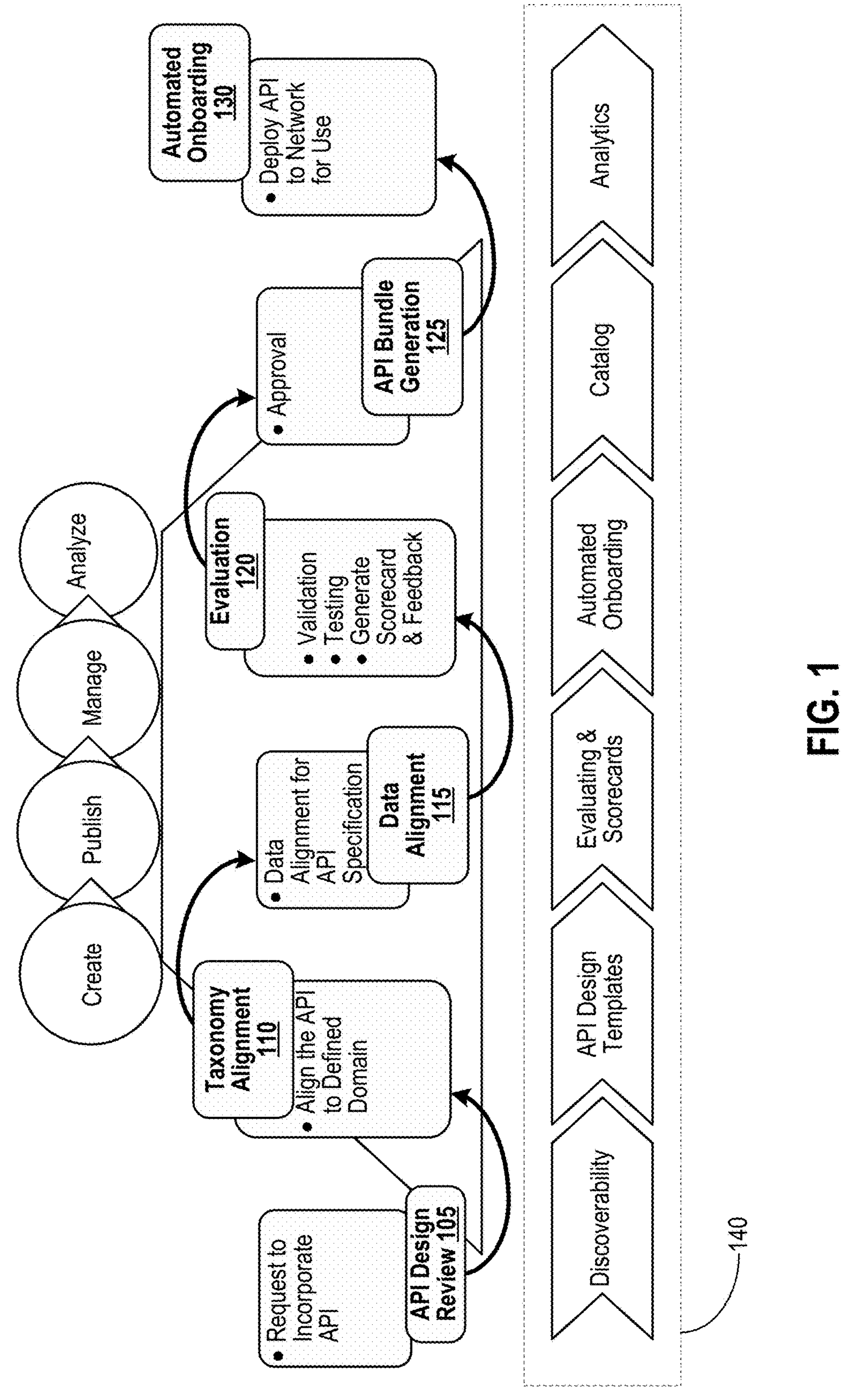
FIG. 1 illustrates a block diagram of a process for automation of application programming interface (API) governance across API life cycles, in accordance with an embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Presented herein is a centralized service for an API management platform may validate, test, integrate, and monitor APIs through their lifecycle, by categorizing and aligning API specifications and identifying any redundancies and deprecations of APIs. The service may be a part of the network environment or separate from the network environment. The service may function as a single source of knowledge about APIs in the given network environment with the use of a robust API catalogue. By active monitoring metadata and performance metrics of the APIs from the network, the service may update API records and update versioning. During the onboarding process, the service may also provide for codified controls and automated review. Through the lifecycle of a given API, the service may provide for automation and tooling for management, as well as observability into usage and analytics.

FIG. 1 illustrates a block diagram of a process 100 for automation of application programming interface (API)

governance across API life cycles. The process 100 may be implemented or performed by a service associated with an API management platform. Under the process 100, at step 105, the service may conduct an API design review, upon receiving a request to incorporate an API. The request may include a specification for the API generated in accordance with an API design template. At step 110, the service may align the API by standardizing the API specification in accordance with a defined domain. The domain may correspond to a type of function or application in which the API is to be used. At step 115, the service may align the associated data in accordance with the domain defined for the API.

Continuing on, at step 120, the service may evaluate the API by performing validation and testing. Based on the validation and testing, the service may generate a score card of the API and feedback for the developer. At step 125, if the API has been successfully validated and tested, the service may determine that the API is approved for use in a network environment. At step 130, the service may generate an API bundle to integrate the API into the environment. At step 135, the service may perform automated onboarding of the API onto the network for use. The process 100 may correspond to a sequence 140 for the life cycle of managing the API. The sequence 140 may include discoverability of the API specifications, using API design templates, with evaluating and scorecard generation, automated onboarding, cataloging, and monitoring analytics.

Figure 2:
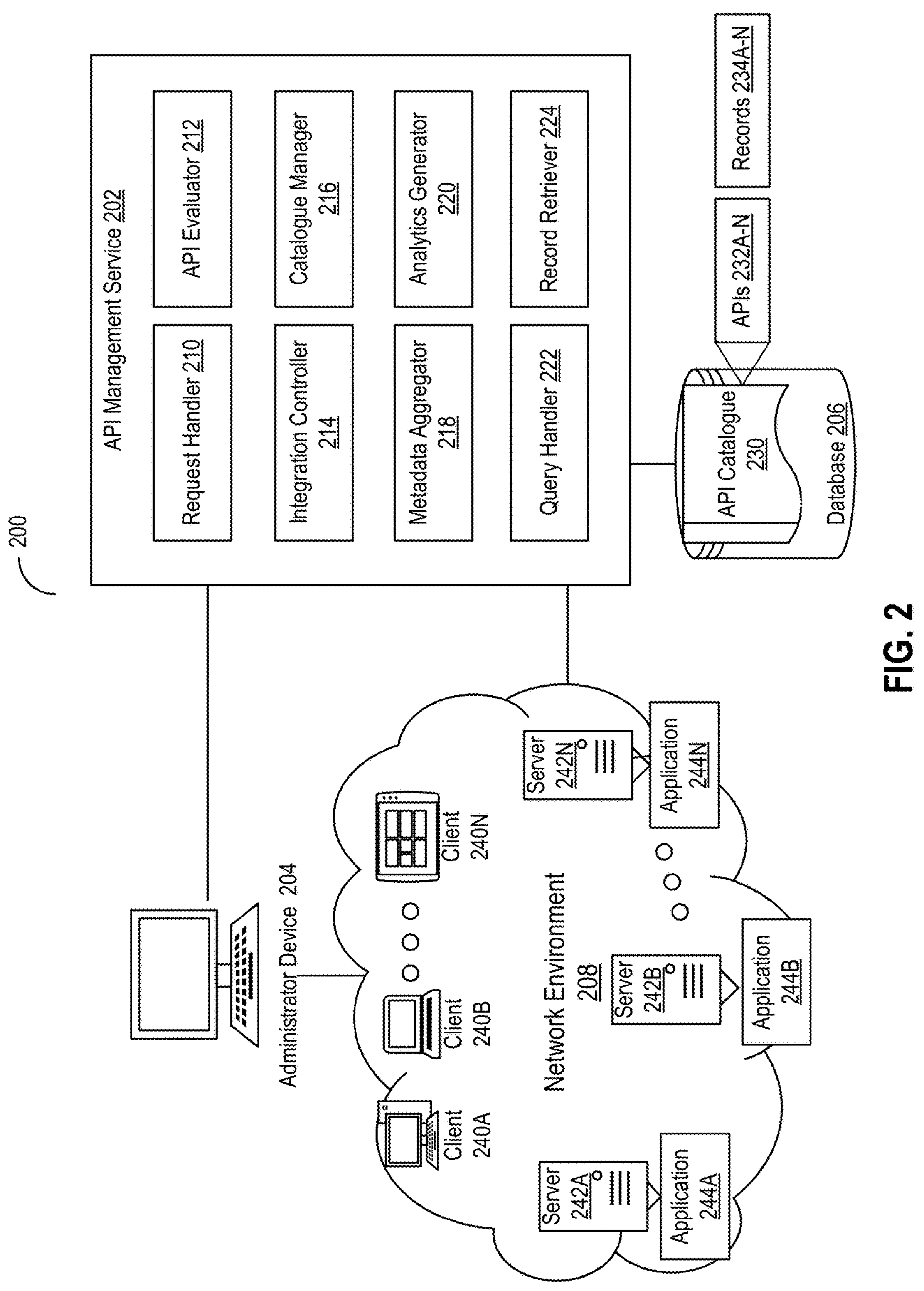
FIG. 2 illustrates a block diagram of a system for managing application programming interfaces (APIs) in network environments, in accordance with an embodiment.

FIG. 2 illustrates a block diagram of a system 200 for managing application programming interfaces (APIs) in network environments. The system 200 may include at least one API management service 202, at least one administrator device 204, at least one database 206, and at least one network environment 208, among others. The API management service 202 may include at least one request handler 210, at least one API evaluator 212, at least one integration controller 214, at least one catalogue manager 216, at least one metadata aggregator 218, at least one analytics generator 220, at least one query handler 222, and at least one record retriever 224, among others. The database 206 may store, maintain, or otherwise include at least one API catalogue 230, among others. The API catalogue 230 may identify a set of APIs 232A-N (hereinafter generally referred to as APIs 232) and a corresponding set of API records 234A-N (hereinafter generally referred to as API records 234). The network environment 208 may include one or more clients 240A-N (hereinafter generally referred to as clients 240) and one or more servers 242A-N (hereinafter generally referred to as servers 242). Each server 242 may host or include at least one application 244A-N (hereinafter generally referred to as applications 244), among others.

Embodiments may comprise additional or alternative components or omit certain components from those of FIG. 2 and still fall within the scope of this disclosure. For example, the API management service 202, the administrator device 204, and database 206 may be part of the same device. Various hardware and software components of one or more public or private networks may interconnect the various components of the system 200. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The API management service 202 may be any computing device including one or more processors coupled with memory and software and capable of performing the various processes and tasks described herein. The API management service 202 may be part of an API governance or management platform to control and administer APIs 232 used in network environments, such as the network environment 208. The API management service 202 may be in communication with the administrator device 204, the database 206, and the network environment 208, among others. Although shown as a single API management service 202, the API management service 202 may include any number of computing devices. The API management service 202 may interface with the administrator device 204 to exchange data associated with APIs to be integrated or onboarded in the network environment 208. The API management service 202 may communicate with the network environment 208 to exchange metadata and performance data about APIs in use among the clients 204, the servers 242, and the applications 242 of the network environment 208. The API management service 202 may control and manage the usage of APIs within the network environment 208.

The API management service 202 may include several subsystems to perform the operations described herein. In the API management service 202, the request handler 210 may receive request to onboard APIs for use under defined domains on the network environment 208. The API evaluator 212 may execute validation and performance testing on the APIs 232 in accordance with policies for domains. The integration controller 214 may manage integration of the APIs 232 based on the results of the validation and testing. The catalogue manager 216 may maintain the API catalogue 230 on the database 206 of API specifications and related data for APIs 232 approved for use in the network environment 208. The metadata aggregator 218 may retrieve metadata and related data associated with the API from various sources, including the administrator device 204 and the network environment 208. The analytics generator 220 may carry out analytics on the metadata associated with APIs. The query handler 222 may receive queries for APIs 232 on the API catalogue 230. The record retriever 224 may search for APIs corresponding to the queries.

The administrator device 204 may be any computing device operable by a user to interface with the API management service 202. For example, the administrator device 204 may be operated or used by an entity associated with a software developer to design and add APIs 232 for use in the network environment 208. In some cases, the entity associated with the administrator device 204 may be an administrator of the network environment 208. The administrator device 204 may include any number of computing devices and may be in communication with the API management service 202 and the network environment 208, among others.

The database 206 may store and maintain various data associated with the APIs, such as the API catalogue 230, or any other data from the API management service 202, the administrator device 204, and the network environment 208, among others. The API catalogue 230 may include or identify a set of API records 234 for corresponding APIs 232 approved for use in the network environment 208. Each API 232 may define, identify, or otherwise include a set of protocols or definitions to permit communications and interfacing among the applications 244 in the network environment 208. Each record 234 may identify or include information related to the respective API 232, such as the metadata and performance analytics, among others. The database 206 may also include a database management system (DBMS) to arrange and organize the data maintained thereon. The data stored and maintained on the database 206 may be in accordance with at least one data scheme. The database 206 may be in communication with the API management service 202, the administrator device 204, and the network environment 208, among others.

The network environment 208 may include or correspond to a defined network in which the set of clients 240 and the servers 242 may be in communication with one another. For example, the network environment 208 may correspond to an enterprise network, with clients 240 spread across multiple locales and servers 242 residing in data centers or branch offices, among others. To facilitate such communications, the network for the network environment 208 may include one or more of: Local Area Network (LAN), Wireless Local Area Network (WLAN), Metropolitan Area Network (MAN), Wide Area Network (WAN), software-defined networking (SDN), virtual private networks (VPNs), and the Internet, among others. The communication over the network may be performed in accordance with various communication protocols, such as Transmission Control Protocol and Internet Protocol (TCP/IP), User Datagram Protocol (UDP), and IEEE communication protocols.

In some embodiments, the network environment 208 may include a cloud-based service, e.g. Software as a Service (Saas), Platform as a Service (PaaS), and Infrastructure as a Service (IaaS). IaaS may refer to a user renting the use of infrastructure resources that are needed during a specified time period. IaaS providers may offer storage, networking, servers or virtualization resources from large pools, allowing the users to quickly scale up by accessing more resources as needed. PaaS providers may offer functionality provided by IaaS, including, e.g., storage, networking, servers or virtualization, as well as additional resources such as, e.g., the operating system, middleware, or runtime resources. SaaS providers may offer the resources that PaaS provides, including storage, networking, servers, virtualization, operating system, middleware, or runtime resources. In some embodiments, SaaS providers may offer additional resources including, e.g., data and application resources.

Each client 240 may be any computing device including one or more processors coupled with memory and software and capable of performing the various processes and tasks described herein. Each client 240 may be associated with an end user entity within the network environment 208. For example, the client 240 may be a virtual machine associated with a member of an enterprise network. The client 240 may be in communication with the servers 242, the network environment 208, the administrator device 204, and the API management service 202, among others.

Each server 242 may be any computing device including one or more processors coupled with memory and software and capable of performing the various processes and tasks described herein. The server 242 may host or include resources for at least one of the applications 244 to be accessed by one of the client 240. The server 242 may be associated with an entity maintaining the respective application 244. For instance, the server 242 may be maintained by the same entity that developed the application 244. The server 242 may be in communication with the clients 240, the network environment 208, the administrator device 204, and the API management service 202, among others.

Each application 244 may be a cloud-based application (e.g., a Software as a Service (Saas)), a web application, microservice, or a service, among others, accessed by end-user customer devices that are communicatively coupled with the network environment 208. For example, the application 244 may be an online banking application, a brokerage account application, a word processor, a spreadsheet program, a multimedia player, a video game, or a software development kit, among others. The applications 244 may interface or communicate with one or another via one or more APIs 232. For instance, one application 244 may access functionality and data of another application 244 via at least one API 232 used in the network environment 208.

The API management service 202 (or the platform) may reside within or outside the network environment 208 for which API management service 202 is managing APIs 232. In some embodiments, the network environment 208 may include the API management service 202. For example, the API management service 202 may reside within the same network as the clients 240 and servers 242, manage and administer the APIs from within the network environment 208, and interface with the administrator device 204 outside the network environment 208. In some embodiments, the network environment 208 may include the administrator device 204. For instance, the administrator device 204 may interface within the API management service 202 outside the network environment 208 to manage and administer API usage within the network environment 208.

In some embodiments, the network environment 208 may include the API management service 202 and the administrator device 204. For example, both the API management service 202 and the administrator device 204 may be part of the network environment 208 to manage and administer APIs used internally within the network environment 208. In some embodiments, the network environment 208 may be separate from the API management service 202 and the administrator device 204. For instance, the administrator of the network environment 208 may interface with the API management service 202 to add and provide specifications for the APIs 232 for use in network environments, such as the network environment 208. The API management service 202 in turn may monitor data within the network environment 208 from outside.

Figure 3:
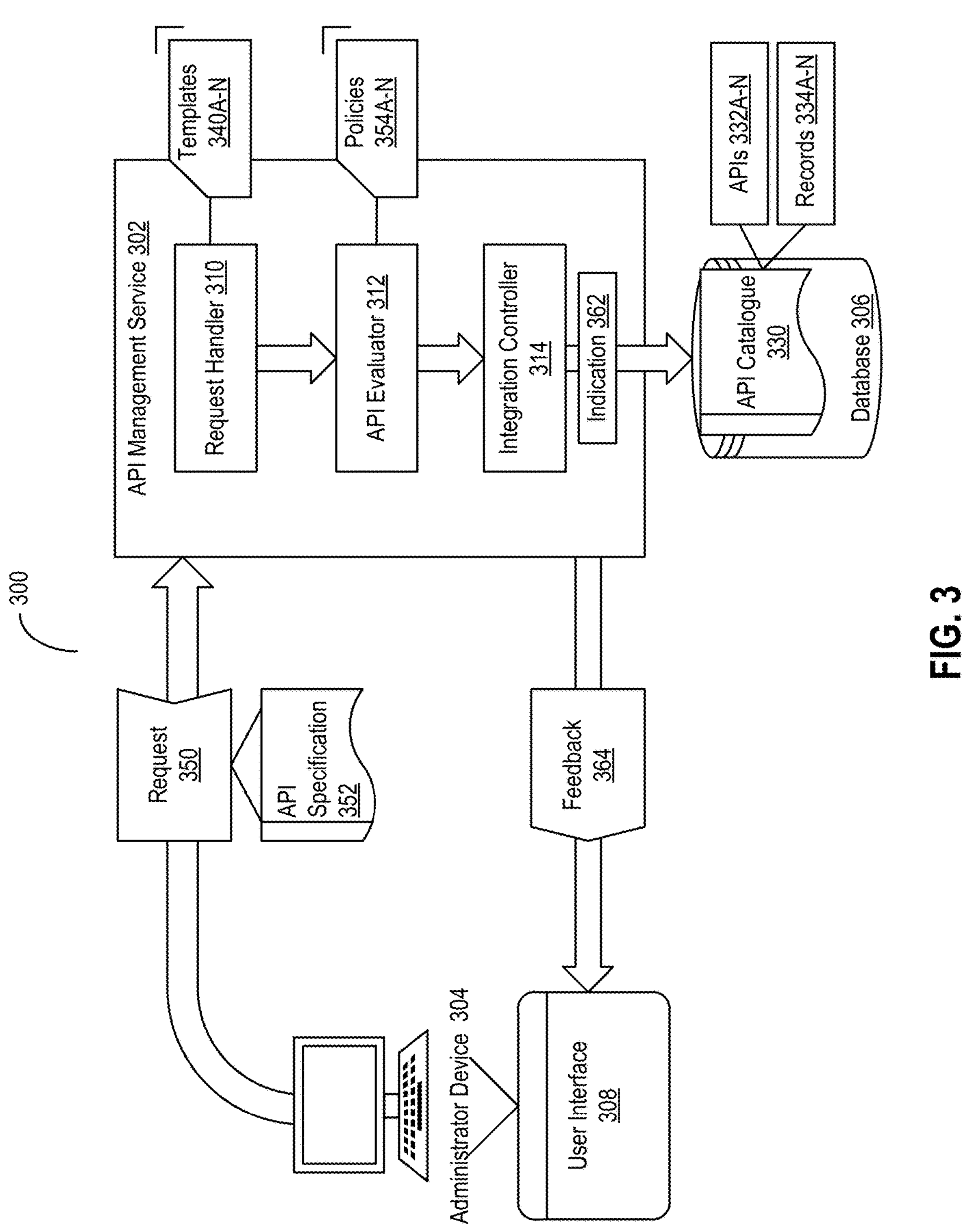
FIG. 3 illustrates a block diagram of a system for integrating application programming interfaces (APIs) for use in network environments, in accordance with an embodiment.

FIG. 3 illustrates a block diagram of a system 300 for integrating application programming interfaces (APIs) for use in network environments. The system 300 may include at least one API management service 302, at least one administrator device 304, and at least one database 306, among others. The API management service 302 may include at least one request handler 310, at least one API evaluator 312, and at least one integration controller 314, among others. The administrator device 304 may provide at least one user interface 308, among others. The database 306 may store or include the API catalogue 330, among others. The API catalogue 330 may include or identify a set of APIs 332A-N (hereinafter generally referred to as APIs 332) and a corresponding set of records 334A-N (hereinafter generally referred to as records 334).

Embodiments may comprise additional or alternative components or omit certain components from those of FIG. 3 and still fall within the scope of this disclosure. Various hardware and software components of one or more public or private networks may interconnect the various components of the system 300. Each component in system 300 (such as the API management service 302, the administrator device 304, and the database 306) may be any computing device comprising one or more processors coupled with memory and software, and capable of performing the various processes and tasks described herein.

The request handler 310 of the API management service 302 stores or maintains a set of template 340A-N (hereinafter generally referred to templates 340). The set of templates 340 may be stored and maintained (e.g., as one or more data structures or files) on the database 306. Each template 340 may specify, define, or otherwise identify a format for the information to be included for defining at least one API 332. The format may define or specify a standardized structure for the arrangement of the information for the API 332. Each template 340 may be associated with one or more respective domains. The domains may correspond to or otherwise be associated with a type of function or application associated with the API 332. The domains may, for example, include various functions of a banking application, such as account management, customer data management, risk management, and messaging, among others. The templates 340 may be defined or configured by an administrator or entity associated with the API management service 302.

The template 340 may specify the format for information for the API 332 itself such as, an endpoint (e.g., a uniform resource identifier (URI) defining an entry point for interacting with the API 332), a method (e.g., an action or operation performed via the API 332), a response format, and error handling, among others. The template 340 may also define the format for metadata associated with the API 332, such as a domain identifier, an API identifier, an API version, an API life cycle stage (e.g., review, testing, validation, onboarding, integrated, or deprecated), a gateway identifier (e.g., the server hosting the associated application), a product identifier (e.g., the associated applications), an API version, an owner identifier, an API type, a data classification (e.g., of the data exchanged through the API 332), an authorization level, a geographical region, or organizations, among others. The template 340 may specify the format for the documentation in accordance with a respective domain. For example, the template 340 may specify information to be included pertinent to the type of function or application associated with the API 332, such as security measures to handle communication of sensitive information.

The request handler 310 may send, transmit, or otherwise provide the user interface 308 to the administrator device 304. In some embodiments, the request handler 310 may transmit or send an instruction to display, render, or otherwise present the user interface 308 via the administrator device 304. The user interface 308 may be a graphical user interface of an application (e.g., web application) supported by the API management service 302. The user interface 308 may include one or more fields (e.g., user interface elements) for defining an API 332. The fields may include or identify, for example: information for the API 332 itself (e.g., an endpoint, a method, a response format, and error handling); metadata for the API 332 (e.g., a domain identifier, an API identifier, an API version, life cycle stage, a gateway identifier, a product identifier, an API version, an owner identifier, an API type, a data classification, an authorization level, a geographical region, or organizations); and documentation for the API 332, among others. In some embodiments, the fields of the user interface 308 may be defined in accordance with one of the templates 340. For example, the administrator device 304 may have requested for the user interface 308 to define the API 332 for a particular domain. The request handler 310 in turn may provide the instructions for presenting the user interface 308 with fields to define the information in accordance with the template 340 of the domain.

The administrator device 304 may retrieve, obtain, or otherwise receive the user interface 308 from the API management service 302. For instance, the administrator device 304 may receive the instruction for presentation of the user interface 308 from the API management service 302. With the receipt, the administrator device 304 may present the user interface 308 via a display, and may accept user inputs on the user interface 308. Using the inputs on the user interface 308, the administrator device 304 may create, write, or otherwise generate at least one request 350. The request 350 may identify or include at least one API specification 352 for the API 332. The API specification 352 may include the information inputted via the fields of the user interface 308. In some embodiments, the administrator device 304 may generate the API specification 352 in an initial format (e.g., different from the templates 340). In some embodiments, the administrator device 304 may generate the API specification 352 in accordance with the template 340 corresponding to the identified domain. With the generation, the administrator device 304 may provide, transmit, or otherwise send the request 350 including the API specification 352 to the API management service 302.

The request handler 310 retrieves, identifies, or otherwise receives the request 350 from the administrator device 304. With receipt, the request handler 310 may process or parse the request 350 to extract or identify the API specification 352. The request handler 310 may extract or identify the information from the API specification 352. From the API specification 352, the request handler 310 may extract or identify information for the API 332 itself (e.g., an endpoint, a method, a response format, and error handling); metadata for the API 332 (e.g., a domain identifier, an API identifier, an API version, life cycle stage, a gateway identifier, life cycle stage, a product identifier, an API version, an owner identifier, an API type, a data classification, an authorization level, a geographical region, or organizations); and documentation for the API 332. In addition, from the information of the API specification 352, the request handler 310 may also determine or identify at least one domain associated with the API 332 defined by the specification 352.

With the identification of the domain, the request handler 310 may identify or select the template 340 corresponding to the domain. The request handler 310 may change, alter, or otherwise modify the API specification 352 in accordance with the template 340. In some embodiments, the request handler 310 may convert or translate the information included in the API specification 352 into the format defined by the template 340. For example, the request handler 310 may perform alignment by inserting the information from the API specification 352 into the structure of the standardized format specified by the template 340 for the domain. The request handler 310 may store and maintain the standardized API specification 352.

The API evaluator 312 of the API management service 302 may store and maintains a set of policies 354A-N (hereinafter generally referred to as policies 354). The set of policies 354 may be stored and maintained (e.g., as one or more data structures or files) on the database 306. Each policy 354 may specify, identify, or otherwise define a set of rules or criterion that the API 332 is to satisfy in order to be approved for use in the network environment. Each policy 534 may be associated with at least one respective domain. For instance, the policy 534 for APIs to be used in banking customer applications may differ from the policy 534 for APIs to be used in data encryption applications.

Each policy 534 may include a set of rules for validation and a set of rules for testing, among others. The rules for validation may identify, for example, data criteria (e.g., expected format of data exchanged through API 332), documentation criteria (e.g., checking for inclusion of information), and compliance criteria (e.g., handling and encryption of data), among others. The rules for testing may identify, for instance, criteria for functionality (e.g., proper operations) and performance metrics (e.g., response times, throughput, and system utilization), among others. The rules for validation and testing may be specific for the domain. For example, the policy 534 may specify that data communicated for APIs related to security applications are to be of a certain encryption level.

The API evaluator 312 selects or identifies at least one policy 356 from the set of policies 354 based on the domain associated with the API 332. In some embodiments, the API evaluator 312 may select the policy 356 based on the domain identified in the template 340 with which the API specification 352 is defined. With the identification of the policy 356, the API evaluator 312 may identify or determine whether the API 332 is validated. The validation may be to permit, allow, or otherwise approve the API 332 for use in the network environment. In some embodiments, the API evaluator 312 may perform the validation, in response to a separate request from the administrator device 304.

To validate, the API evaluator 312 may check the API 332 (or the API specification 352) using the set of rules defined by the policy 356. The set of rules may include the rules for validation in the policy 356. For each rule of the policy 356, the API evaluator 312 may determine whether the API 332 satisfies the criterion defined by the rule. If the API 332 satisfies the criterion, the API evaluator 312 may determine that the API 332 is in compliance with the rule. Conversely, if the API 332 does not satisfy the criterion, the API evaluator 312 may determine that the API 332 is in not compliance with the rule. When the API 332 is in compliance with all the rules, the API evaluator 312 may determine that the API 332 is validated. Otherwise, when the API 332 is not in compliance with all the rules, the API evaluator 312 may determine that the API 332 is not validated. In some embodiments, the API evaluator 312 may identify a subset of rules that the API 332 is not in compliance with (e.g., not validated) and a remaining subset of rules that the API 332 is in compliance with (e.g., validated).

In some embodiments, the API evaluator 312 may identify or determine whether the API 332 satisfies a functionality (or performance) criterion using the set of rules defined by the policy 356. The set of rules may include the rules for testing as defined by the policy 356. For each rule of the policy 356, the API evaluator 312 may determine whether the API 332 satisfies the criterion defined by the rule. If the API 332 satisfies the criterion, the API evaluator 312 may determine that the API 332 is in compliance with the rule. Conversely, if the API 332 does not satisfy the criterion, the API evaluator 312 may determine that the API 332 is in not compliance with the rule. When the API 332 is in compliance with all the rules, the API evaluator 312 may determine that the API 332 satisfies the functionality criterion. Otherwise, when the API 332 is not in compliance with all the rules, the API evaluator 312 may determine that the API 332 docs not satisfy the functionality criterion. In some embodiments, the API evaluator 312 may identify a subset of rules that the API 332 is not in compliance with and identify a remaining subset of rules that the API 332 is in compliance.

The integration controller 314 of the API management service 302 produces, creates, or otherwise generates at least one indication 362 based on determining whether the API 332 is validated. When the API 332 is determined to be validated, the integration controller 314 may generate the indication 362 to approve the API 332 for use in the network environment. When the API 332 is determined to be not validated, the integration controller 314 may generate the indication 362 to disapprove the API 332 for use in the network environment. In some embodiments, the integration controller 314 may generate the indication 362 based on determining whether the API 332 is validated and whether the API 332 satisfies the functionality criterion. When the API 332 is determined to be validated and satisfy the functionality criterion, the integration controller 314 may generate the indication 362 to approve the API 332 for use in the network environment. When the API 332 is determined to be not validated or not satisfy the functionality criterion, the integration controller 314 may generate the indication 362 to disapprove the API 332 for use in the network environment.

With the generation of the indication 362, the integration controller 314 may store and maintain an association between the API 332 (or the API specification 352) and the indication 362 on the database 306. The integration controller 314 may add, insert, or otherwise include the association of the API 332 (or the API specification 352 standardized according to the template 340) as a record 334 in the API catalogue 330. When the indication 362 is to approve the API 332 for use in the network environment, the integration controller 314 may store the association to permit the use of the API 332 in the network environment. The integration controller 314 may perform integration of the API 332 for use by the applications in the network environment. The integration may include permitting applications to invoke functions defined by the API 332 and developers associated with the network environment to access documentation related to the API 332 through the database 306. The integration controller 314 may also generate an API bundle using the API specification 352 to make the API 332 available for use in the network environment. Conversely, when the indication 362 is to disapprove the API 332 for use in the network environment, the integration controller 314 may store the association to restrict the use of the API 332 in the network environment. By restricting, the applications in the network environment may not invoke functions defined by the API 332 and developers associated with the network environment may not access documentation related to the API 332.

In some embodiments, the integration controller 314 may determine, produce, or otherwise generate at least one feedback 364 to provide to the administrator device 304. The feedback 364 may include or identify the indication 362 of approval or disapproval of the API 332. In some embodiments, when the API 332 is determined to be not validated or not satisfy the functionality criterion, the integration controller 312 may generate the feedback 364 to include an identification of which rules the API 332 is in compliance with and which rules that API 332 is not in compliance with. In some embodiments, when the API 332 is determined to be not validated or not satisfy the functionality criterion, the integration controller 312 may determine or generate a validation score for the API 332. The validation score may be based on which subset of rules that the API 332 is not in compliance with and a remaining subset of rules that the API 332 is in compliance. The validation score may indicate a degree of compliance with the policy 354. The integration controller 314 may generate the feedback 364 to include the validation score. With the generation, the integration controller 314 may provide, send, or transmit the feedback 364 for presentation via the user interface 308 on the administrator device 304.

The administrator device 304 may retrieve, identify, or otherwise receive the feedback 364 from the API management service 302. With the receipt, the administrator device 304 may render, display, or otherwise present the feedback 364 on the user interface 308. When the indication 362 is of approval, the administrator device 304 may present the indication 362 of approval on the user interface 308. Conversely, when the indication 362 is of disapproval, the administrator device 304 may present the indication 362 of disapproval on the user interface 308. For example, the user interface 308 may display the indication 362 of approval or disapproval with a user interface element and a set of flags to identify which rules the API 332 satisfies or did not satisfy. In addition, the user interface 308 may also display a score card using the validation score for the API 332. The user of the administrator device 304 may use the information on the user interface 308 to modify the definition of the information for the API 332 to include in the API specification 352. Upon modification of the definitions, the administrator device 304 may submit another request to validate the API 332. The process may be repeated again, with the submission of the request.

Figure 4A:
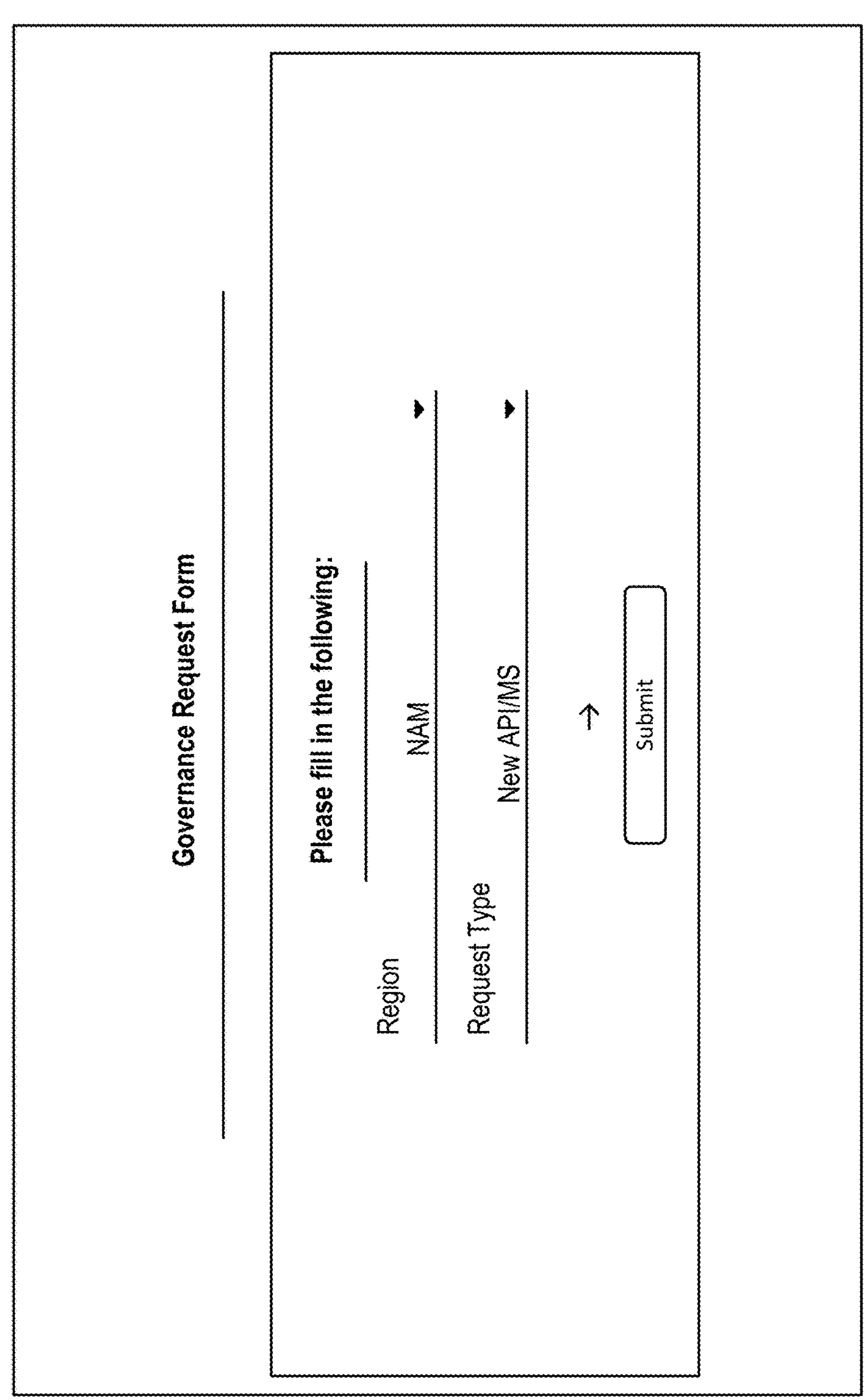
FIG. 4A illustrates a screenshot of a user interface for submitting requests for application programming interfaces (APIs), in accordance with an embodiment.
Figure 4B:
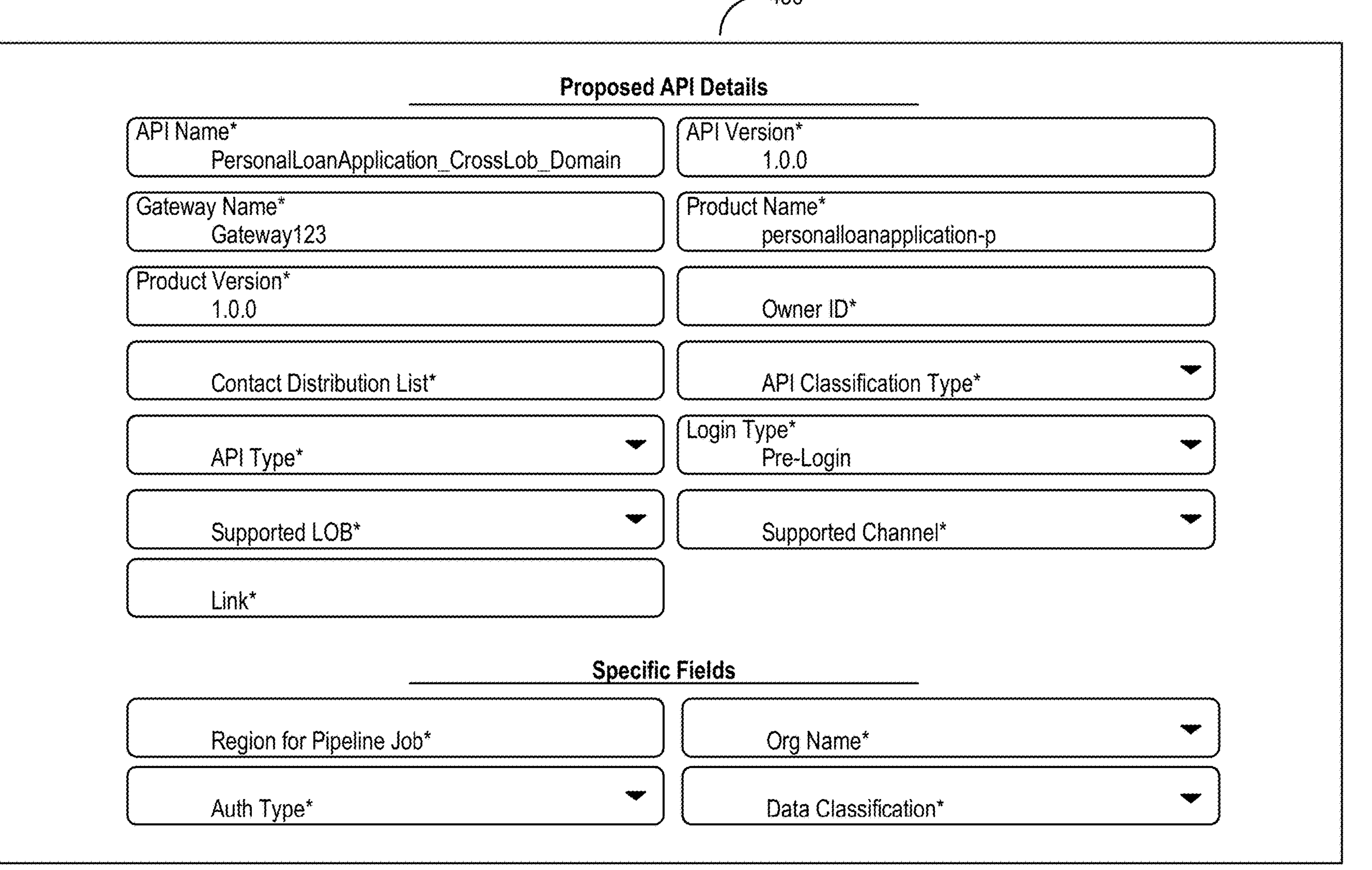
FIG. 4B illustrates a screenshot of a user interface for inputting information on application programming interfaces (APIs) for requests, in accordance with an embodiment.

FIG. 4A illustrates a screenshot of a user interface 400 for submitting requests for application programming interfaces (APIs). The user interface 400 may be used to start a request to onboard an API for use by applications and microservices in a defined network environment, such as an enterprise network. The user interface 400 may include or identify a field for region and a request type (e.g., an addition of a new API). FIG. 4B illustrates a screenshot of a user interface 430 for inputting information on application programming interfaces (APIs) for requests. The user interface 430 may include a number of fields for entering information to define a new API for use in the defined network environment. In the depicted example, the fields may include an API name, an API version, a gateway name, a product name, a product version, an owner identifier, a contact list, an API classification type, an API type, a login type, a line of business (LOB), a channel, a link, a region, an organization name, an authorization type, and a data classification, among others. The fields may be used to construct information to define the new API to be added to the defined network environment.

FIG. 4C illustrates a screenshot of a user interface 460 for indicating results of validation and testing of application programming interfaces (APIs). The user interface 460 may be used to test, revise, and deploy (also referred as run, review, and release) new APIs into the defined network environment. The user interface 460 may include a column 465 listing API names of new APIs under testing. The user interface 460 may include a column 470 indicating a status of testing or deployment of the new APIs. The user interface 460 may include a column 475 indicating which template was used to define and generate the API specifications for the corresponding API. The user interface 460 may include a column 480 may indicate validation and testing results for the APIs. The user interface 460 may be used by the user to investigate and examine potential validation and compliance issues with APIs.

Figure 5:
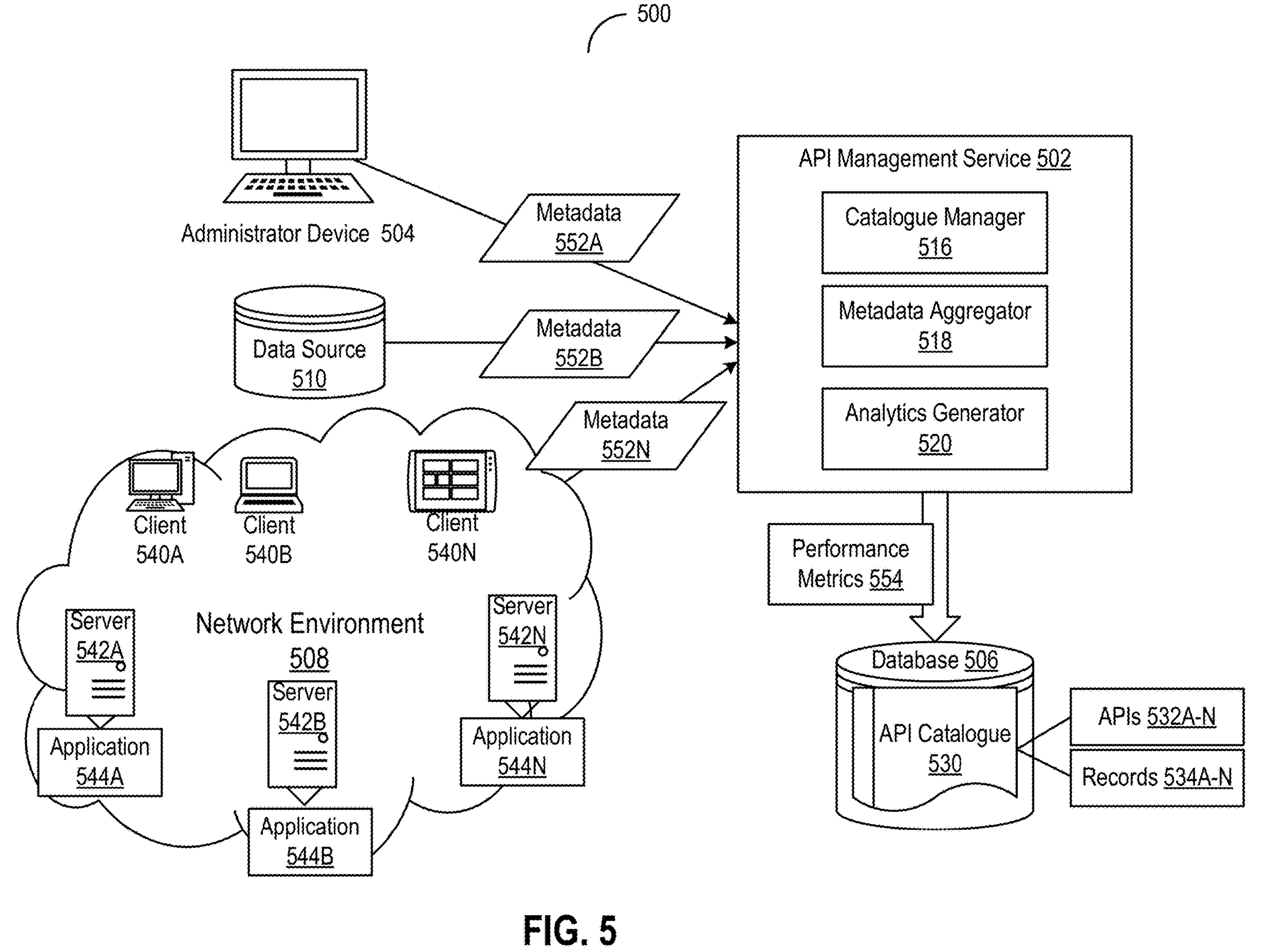
FIG. 5 illustrates a block diagram of a system for aggregating metadata associated with application programming interfaces (APIs) from various data sources, in accordance with an embodiment.

FIG. 5 illustrates a block diagram of a system 500 for aggregating metadata associated with application programming interfaces (APIs) from various data sources. The system 500 may include at least one API management server 502, at least one administrator device 504, at least one database 506, at least one network environment 508, and at least one data source 510, among others. The API management server 502 may include at least one catalogue manager 516, at least one metadata aggregator 518, and at least one analytics generator 520, among others. The database 506 may store, maintain, or otherwise include at least one API catalogue 530. The API catalogue 530 may include or identify a set of APIs 532A-N (hereinafter generally referred to as APIs 532) and a corresponding set of records 534A-N (hereinafter generally referred to as records 534), among others. The network environment 508 may include one or more clients 540A-N (hereinafter generally referred to as client 540) and one or more servers 542A-N (hereinafter generally referred to as servers 542) hosting one or more applications 544A-N (hereinafter generally referred to as applications 544), among others. The data source 510 may be associated with the entity of the API management service 502, among others.

Embodiments may comprise additional or alternative components or omit certain components from those of FIG. 5 and still fall within the scope of this disclosure. Various hardware and software components of one or more public or private networks may interconnect the various components of the system 500. Each component in system 300 (such as the service 210, or the data processing service 205) may be any computing device comprising one or more processors coupled with memory and software, and capable of performing the various processes and tasks described herein.

The catalogue manager 516 of the API management service 502 stores and maintains the API catalogue 530 on the database 506. The API catalogue 530 may include or identify the set of APIs 532 (e.g., API specifications) and the corresponding set of records 534, among others. Each record 534 may include or identify information about the respective API 532. The record 534 may include, for example, information for the API 532 itself (e.g., an endpoint, a method, a response format, and error handling); metadata for the API 532 (e.g., a domain identifier, an API identifier, an API version, life cycle stage, a gateway identifier, a product identifier, an API version, an owner identifier, an API type, a data classification, an authorization level, a geographical region, or organizations); and documentation for the API 532, among others. Each record 532 may define or identify at least one of a set of domains associated with the API 532. The domains may include those that the API 532 is approved for use in the network environment 508. In some embodiments, the record 534 may include information associated with the API 532 approved for use in the network environment 508. The catalogue manager 516 may update the API catalogue 530.

The metadata aggregator 518 of the API management service 502 may aggregate, collect, or otherwise retrieve metadata 552A-N (hereinafter generally referred to as metadata 552) for each API 532 on the API catalogue 530. Upon integrating or on-boarding the API 532 on the network environment 508, the metadata aggregator 518 may monitor data associated with the API 532 from various sources. The metadata 552 may be retrieved from various sources, such as the administrator device 504, the network environment 508, and the data source 510 (e.g., associated with the API management entity), among others. In some embodiments, the metadata aggregator 518 may receive the metadata 552 including usage data of the API 532 in the network environment 508. The usage data may identify or include a rate of requests, throughput, traffic patterns, distribution of devices (e.g., clients 540 or servers 542) using the API 532, response times, error rates, and authentications, among others. In some embodiments, the metadata aggregator 518 may receive the metadata 552 including modification of the API specification from the data source 510 associated with the API management platform. In some embodiments, the metadata aggregator 518 may receive the metadata 552 including the modification of the API specification from the administrator device 504. The modification may include any changes to the information on the API 532 itself, other previously stored metadata for the API 532, or documentation for the API 532, among others.

In some embodiments, the metadata aggregator 518 may identify or determine whether the API 532 is duplicative or redundant with another API 532 based on the respective metadata 552 of the APIs 532. To determine, the metadata aggregator 518 may compare the metadata 552 of the first API 532 with the metadata 552 of the second API 532. In some embodiments, the metadata aggregator 518 may compare the record 534 (e.g., API specification) of the first API 532 with the record 534 (e.g., API specification) of the second API 532. The comparison may be facilitated using a semantic analysis, syntax comparison, functional comparison, endpoint comparison, or method analysis, among others. Based on the comparison, the metadata aggregator 518 may calculate, generate, or otherwise generate a similarity measure. The similarity measure may indicate a degree of similarity between the APIs 532. When the similarity measure satisfies (e.g., greater than or equal to) a threshold, the metadata aggregator 518 may identify or determine that the first API 532 is redundant with the second API 532. Otherwise, when the similarity measure does not satisfy (e.g., less than) a threshold, the metadata aggregator 518 may identify or determine that the first API 532 is not redundant with the second API 532.

In some embodiments, the metadata aggregator 518 may identify or determine whether a version of the API 532 is in use or deprecated based on the usage data identified in the metadata 552 for the API 532. From the metadata 552, the metadata aggregator 518 may extract or identify the usage data for the version of the API 532. The metadata aggregator 518 may calculate, determine, or otherwise generate a usage metric based on the usage data. The usage metric may indicate a degree of use (e.g., associated with request rate and traffic patterns) of the API 532 within the network environment 508. When the usage measure satisfies (e.g., greater than or equal to) a threshold, the metadata aggregator 518 may identify or determine that the version of the API 532 is in use. Otherwise, when the usage measure does not satisfy (e.g., less than) a threshold, the metadata aggregator 518 may identify or determine that the first API 532 is deprecated. The metadata aggregator 518 may repeat the determination with another version of the same API 532 to select or identify a version of the API 532 to which the network environment 508 is to be migrated.

In some embodiments, the metadata aggregator 518 may determine, select, or otherwise identify a classification from a set of classifications for the API 532 based on the metadata 552. Each classification may correspond to a functionality or usage pattern of the API 532 in the network environment 508. For example, the classifications may include a data API (e.g., to provide access to data across applications 544) or a service API (e.g., to provide functionalities to different applications 544), architecture or protocol type (e.g., representational state transfer (REST), Hypertext Transfer Protocol (HTTP), simple object access protocol (SOAP), among others. For instance, the metadata aggregator 518 may identify that the classification of the protocol type for the API 532 is REST when the modifications to the specification define REST as the protocol to be used for the API 532. The metadata aggregator 518 may parse or process the metadata 552 to extract or identify function calls or protocol types. Based on the parsing the metadata 552, the metadata aggregator 518 may identify the classification for the API 532.

In some embodiments, the metadata aggregator 518 may create, write, or otherwise generate at least one graph for the API 532 using the metadata 552. The graph may be used to facilitate searching of APIs 532 from the API catalogue 530. The graph may identify or include a set of nodes and a set of edges. Each node may correspond to a respective element in the metadata 552, such as domain identifier, an API identifier, an API version, life cycle stage, a gateway identifier, a product identifier, an API version, an owner identifier, an API type, a data classification, an authorization level, a geographical region, or an organization, among others. Each edge may specify or define a relationship between a pair of the nodes within the graph. The edges may be directed (e.g., indicating a one-way relationship between the data elements) or undirected (e.g., indicating a two-way relationship between the corresponding pair of data elements), among others.

The analytics generator 520 of the API management service 502 creates, determines, or otherwise generates performance metrics 554 for the API 532 using the metadata 552 including usage data from the network environment 508. The performance metrics may indicate or identify various operational aspects of the API 532, and may include, for example, request rates, response time, latency, throughput, error rates, availability, and downtime, among others. The analytics generator 520 may generate the performance metrics 554 for the API 532 over a defined time period (e.g., days, weeks, months, or years) based on the metadata 552. The analytics generator 520 may generate the performance metrics 554 as a function of the usage indicated int the metadata 554 for the API 532.

Using the metadata 552, the catalogue manager 516 may change, modify, or otherwise update the record 534 on the API catalogue 530. In some embodiments, the catalogue manager 516 may update the record 534 to include the indication of whether the API 532 is redundant with another API 532 in the network environment 508. The record 534 may include an identification of two or more APIs 532 identified as redundant. In some embodiments, the catalogue manager 516 may update the record 534 to include an indication of whether the version of the API 532 is in use or deprecated. If deprecated, the catalogue manager 516 may also update the record 534 to include an identification of another version of the API 532 in use. In some embodiments, the catalogue manager 516 may update the record 534 to include the classification for the API 532. In some embodiments, the catalogue manager 516 may update the record 534 to include the graph generated using the metadata 552 for the API 532. In some embodiments, the catalogue manager 516 may update the record 534 to include the performance metrics 554. The catalogue manager 516 may update the records 534 on the API catalogue 530 as more and more metadata 552 is aggregated from the various data sources.

Figure 6:
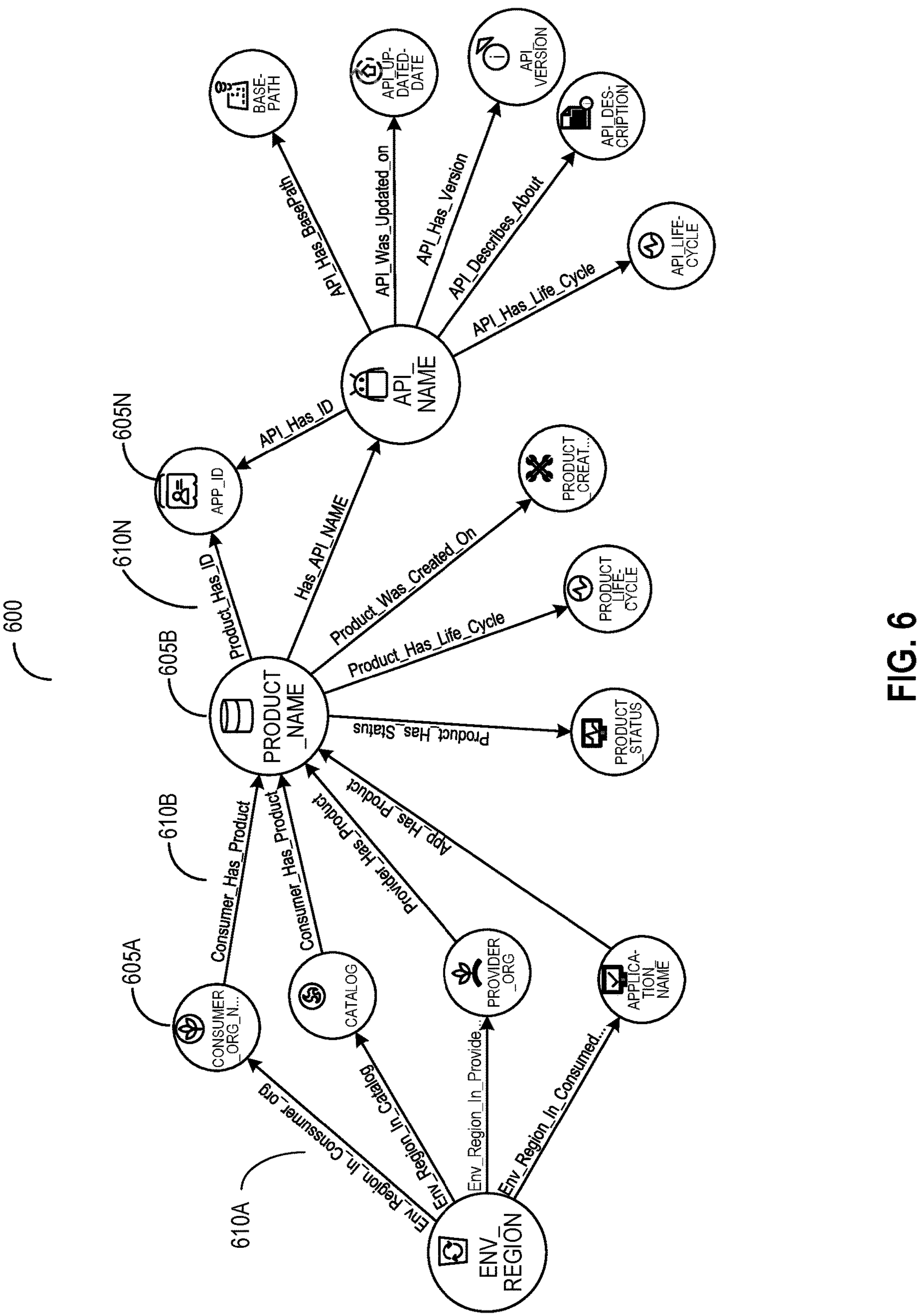
FIG. 6 illustrates a block diagram of a graph for data elements in metadata associated with application programming interfaces (APIs) from various data sources, in accordance with an embodiment.

FIG. 6 illustrates a block diagram of a graph 600 for data elements in metadata associated with application programming interfaces (APIs) from various data sources. The graph 600 may identify or include a set of nodes 605A-N (hereinafter generally referred to as nodes 605) and a set of edges 610A-N (hereinafter generally referred to as edges 610), among others. The graph 600 may have been generated using metadata for an API. Each node 605 may correspond to a data element in the metadata associated with the API, such as region, provider identifier, application name, consumer organization, product name, product status, a product life cycle identification, production, application identifier, operating system name, a base path, an update timestamp, an API version, an API documentation, and API lifecycle, among others. The edges 610 in the graph 600 may be directional and may specify a relationship among the data elements for the corresponding nodes 605.

Figure 7:
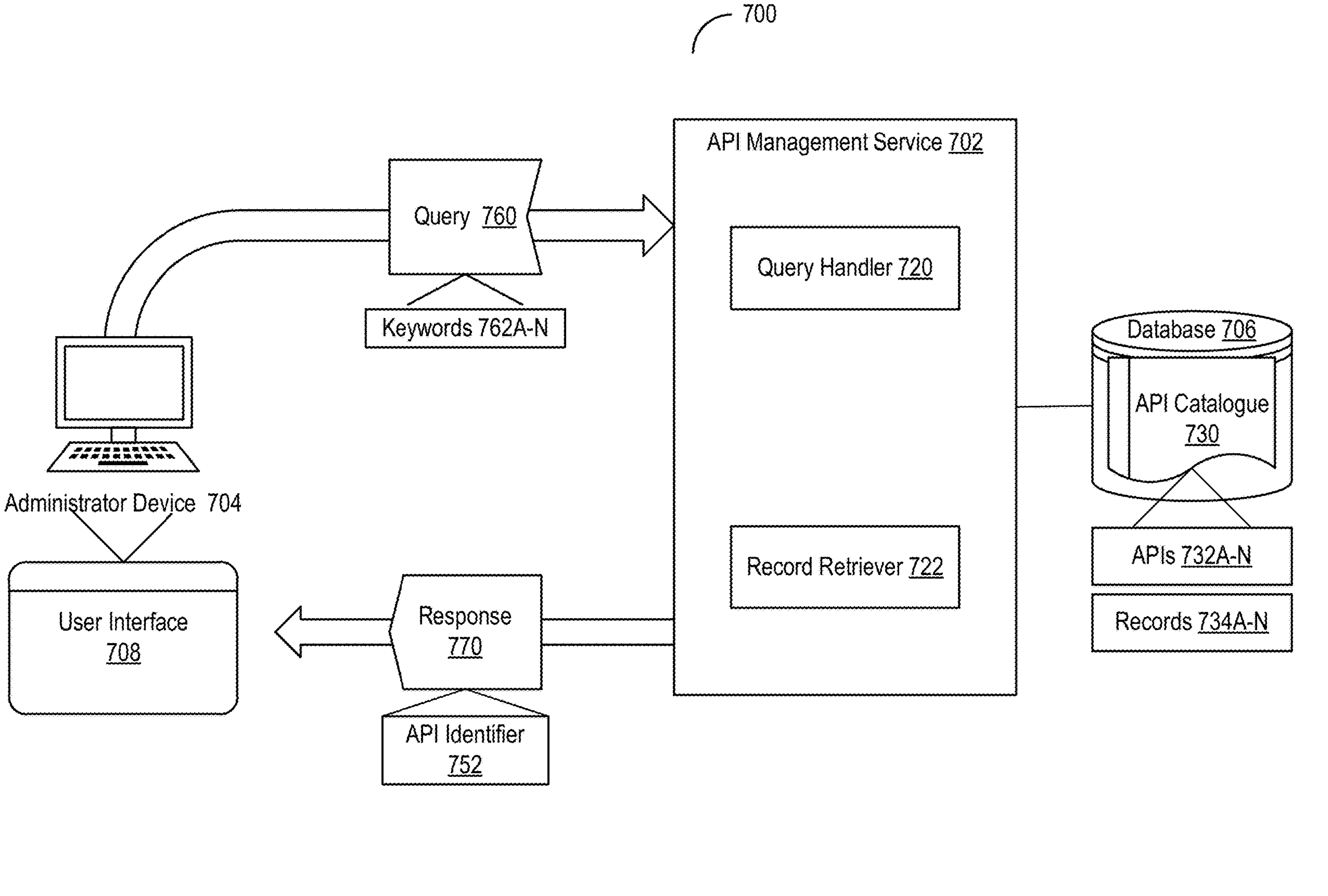
FIG. 7 illustrates a block diagram of a system for accessing application programming interface (API) catalogues used in network environments, in accordance with an embodiment.

FIG. 7 illustrates a block diagram of a system 700 for accessing application programming interface (API) catalogues used in network environments. The system 700 may include at least one API management service 702, at least one administrator device 704, and at least one database 706, among others. The API management service 702 may include at least one query handler 720 and at least one record retriever 722, among others. The administrator device 704 may provide at least one user interface 708. The database 706 may store, maintain, or otherwise include at least one API catalogue 730. The API catalogue 730 may identify or include a set of APIs 732A-N (hereinafter generally referred to as APIs 732) and a corresponding set of records 734A-N (hereinafter generally referred to as records 734), among others.

Embodiments may comprise additional or alternative components or omit certain components from those of FIG. 7 and still fall within the scope of this disclosure. Various hardware and software components of one or more public or private networks may interconnect the various components of the system 700. Each component in system 700 (such as the service 210, or the data processing service 205) may be any computing device comprising one or more processors coupled with memory and software, and capable of performing the various processes and tasks described herein.

The query handler 720 of the API management service 702 may send, transmit, or otherwise provide the user interface 708 to the administrator device 704. In some embodiments, the query handler 720 may transmit or send an instruction to display, render, or otherwise present the user interface 708 via the administrator device 704. The user interface 708 may be a graphical user interface of an application (e.g., web application) supported by the API management service 302. The user interface 708 may include one or more fields (e.g., user interface elements) for searching for APIs 732 from the catalogue 730. For example, the fields may include or identify a domain, a functionality, or application, version, classification, or any metadata detailed herein associated with the API 732. In some embodiments, the query handler 720 may execute a chatbot using machine learning, artificial intelligence (AI) algorithms, or rules-based systems, among others. The chatbot may simulate conversation with the user on the administrator device 704 to accept input from the user and to generate outputs indicating search query results to the user. The user interface 708 may be a chat interface (e.g., as part of a conversation interface) to enter input for the chatbot.

The administrator device 704 may retrieve, obtain, or otherwise receive the user interface 708 from the API management service 702. For instance, the administrator device 704 may receive the instruction for presentation of the user interface 704 from the API management service 702. With the receipt, the administrator device 704 may present the user interface 708 via a display and may accept user inputs on the user interface 708. Using the information inputted on the user interface 708, the administrator device 304 may create, write, or otherwise generate at least one query 760. The query 760 may identify or include one or more keywords 762A-N (hereinafter generally referred to as keywords 762) to be used to find APIs 732. The query 760 (or at least one of the keywords 762) may identify at least one domain to be searched for the APIs 732. In some embodiments, the query 760 may be generated using input on the chat interface (e.g., conversational interface).

The query handler 720 may retrieve, identify, or otherwise receive the query 760 form the administrator device 704. With receipt, the query handler 720 may process or parse the query 760 to extract or identify the keywords 762 from the query 760. In some embodiments, the query handler 720 may identify the keywords 762 from the inputs on the chat interface for the chatbot. In some embodiments, the query handler 720 may identify the domain to be searched from the query 760. With the identification, the query handler 720 may produce or generate additional keywords in accordance with keyword expansion. The generation of additional keywords may be in accordance with a semantic graph identifying related keywords and phrases.

Based on the keywords 762 of the query 760 and the records 732 (or metadata), the record retriever 722 may identify or select one or more records 732 for a corresponding APIs 732 from the API catalogue 730. The selection may be based on the keywords 762 matching or corresponding with at least a portion of the records 732. The record retriever 722 may use a searching engine or algorithm to select the records 732. In some embodiments, the record retriever 722 may select an initial set of records 732 for the corresponding APIs 732 based on the domain identified in the query 760. From the initial set, the record retriever 722 may use the keywords 762 to select the one or more records 732. In some embodiments, the record retriever 722 may select the record 732 using the keywords 762 and the graphs in the records 732. For instance, the record retriever 722 may select the records 732 based on the keywords 762 matching nodes in the graphs of the records 732.

With the selection, the record retriever 722 may produce, output, or otherwise transmit at least one response 770 to provide to the administrator device 704. The response 770 may identify or include at least one API identifier 752. The API identifier 752 may identify a respective record 734 and by extension the corresponding API 732 from the API catalogue 730. In some embodiments, the record retriever 722 may generate the response 770 to include information associated with the API 732, such as the performance metrics, the API specification, metadata, and domains, among others. With the generation, the record retrieve 722 may provide, send, or otherwise transmit the response 770 to the administrator device 704 for presentation on the user interface 708. The administrator device 704 may retrieve, identify, or otherwise receive the response 770 from the API management service 702. With receipt, the administrator device 704 may render, display, or otherwise present the API identifier 752 on the user interface 708. In some embodiments, the administrator device 704 may present the information associated with the API 732 such as the performance metrics, the API specification, metadata, and domains, among others.

In this manner, the API management service may provide for centralized records of APIs available for use in the network environment. The use of templates for API specifications may improve consistency and standardize of API related information. By controlling integration of APIs into the network environment, the service may further ensure that the API specification are successfully validated and tested prior to the integration. The continuous monitoring by the service may allow for lifecycle management of the APIs from development, deployment, versioning, and deprecation. The centralized catalogue may also provide a consistent and standardized information about APIs as well as performance metrics of the APIs used in the network environment.

With the improvement in the API governance for the network environment, the computing resources and network bandwidth of the servers and clients in the network environment may be more efficiently allocated. Furthermore, new APIs may be deployed in a standard and consistent manner, thereby increasing the adaptation of newer functionality in the network environment.

Figure 8A:
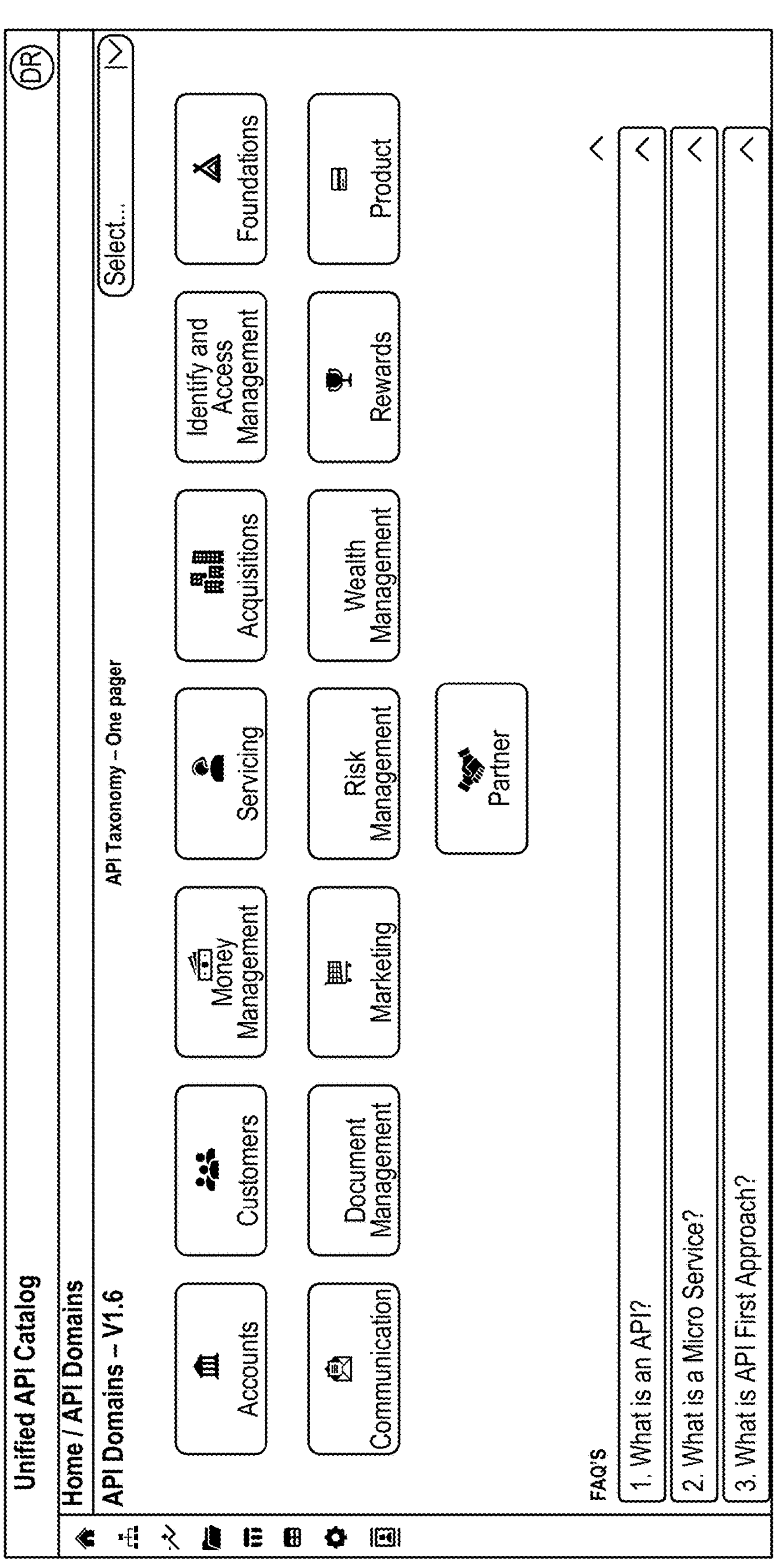
FIG. 8A illustrates a screenshot of a user interface with a list of domains for application programming interface (API) catalogues, in accordance with an embodiment.

FIG. 8A illustrates a screenshot of a user interface 800 with a list of domains for application programming interface (API) catalogues. The user interface 800 may include a list of API taxonomies (or domains), such as accounts, customers, money management, servicing, acquisitions, access management, foundations, communications, document management, marketing, wealth management, rewards, products, and partnerships, among others. The user may select one of the taxonomies on the user interface 800 to view which APIs are available in each taxonomy.

Figure 8B:
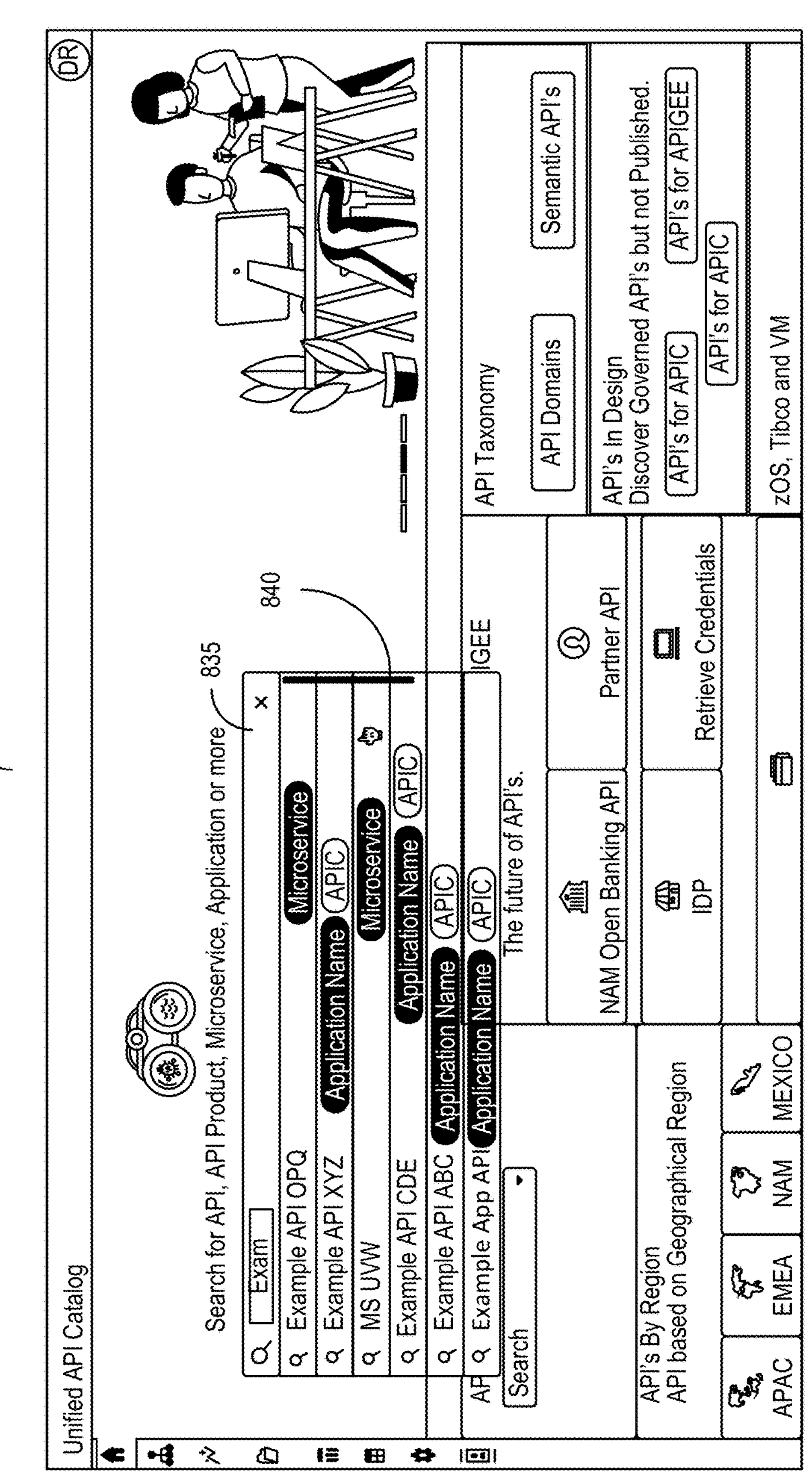
FIG. 8B illustrates a screenshot of a user interface to search application programming interface (API) catalogues, in accordance with an embodiment.
Figure 8C:
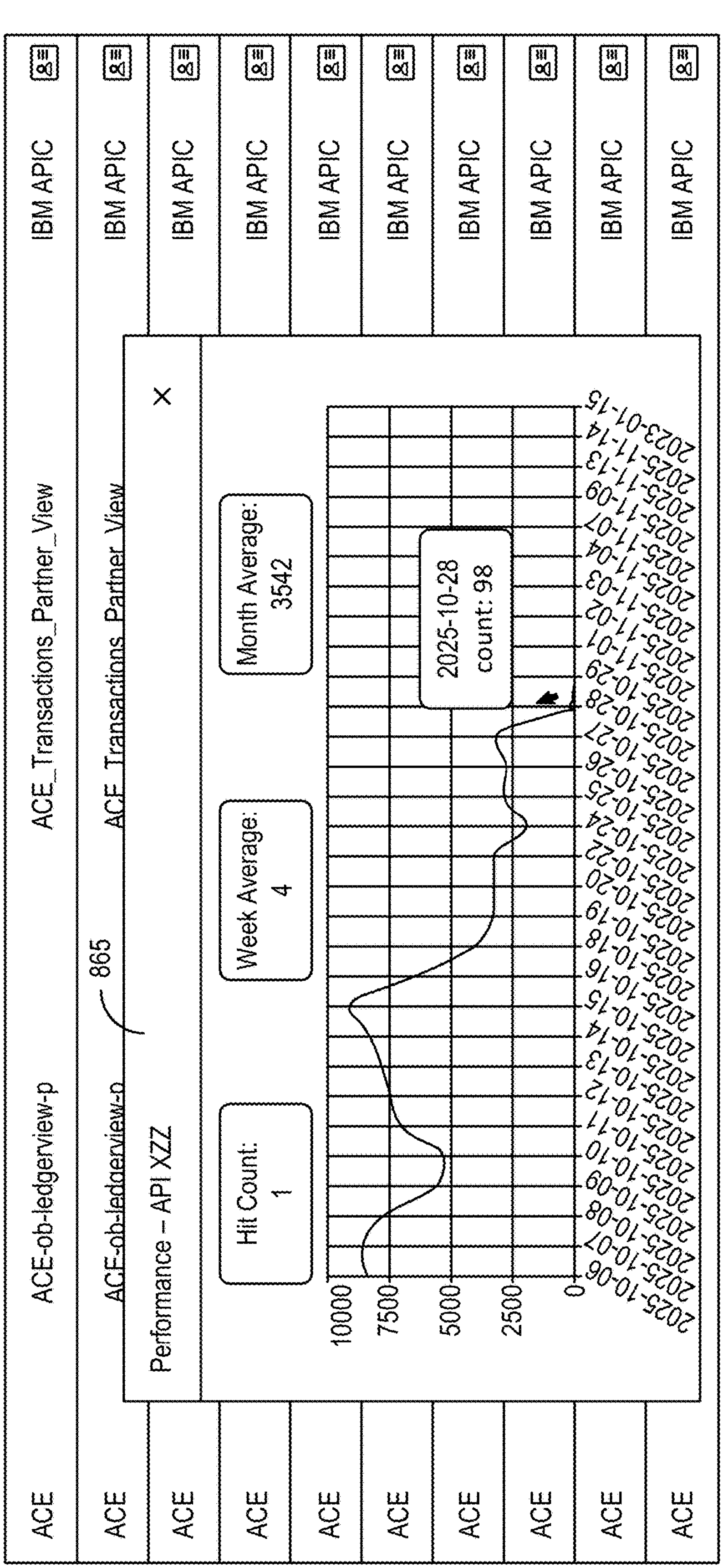
FIG. 8C illustrates a screenshot of a user interface including performance metrics for application programming interfaces (APIs), in accordance with an embodiment.

FIG. 8B illustrates a screenshot of a user interface 830 to search application programming interface (API) catalogues. The user interface 830 may be the graphical user interface for querying the API catalogue. The user interface 830 may include at least one search field 835 to enter one or more keywords. As the user types in the keywords for searching the API catalogue, the user interface 830 may display a list of results 840. The list of results 810 may identify a set of APIs corresponding to the keywords. The user may select one of the results to view further information about the API. FIG. 8C illustrates a screenshot of a user interface 860 including performance metrics for application programming interfaces (APIs). The user interface 860 may include at least one performance metrics window 865. The performance metrics window 865 may include usage of the given API (e.g., "API XZZ") across a time.

Figure 9:
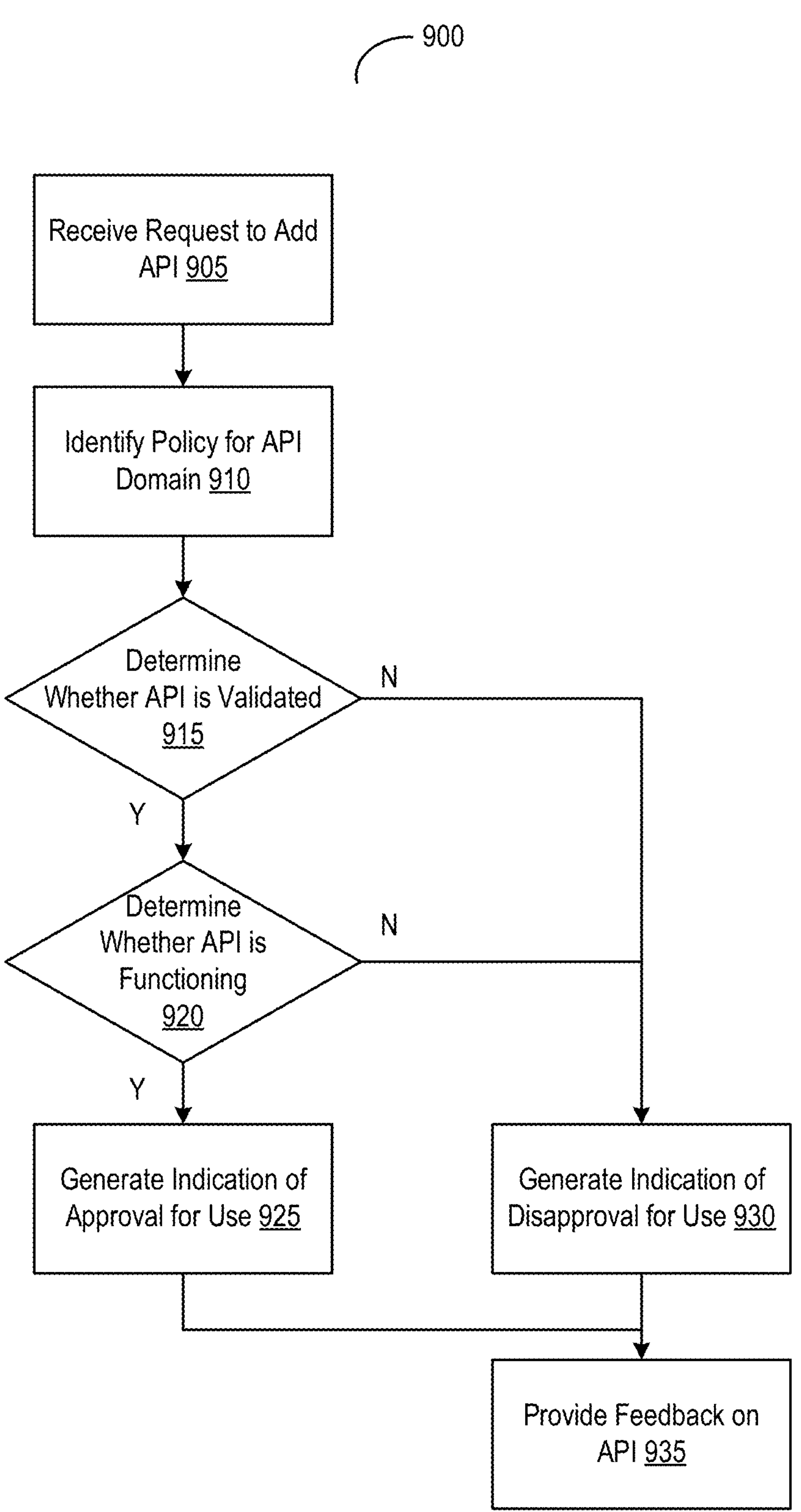
FIG. 9 illustrates a flow diagram of a method of integrating application programming interfaces (APIs) for use in networked environments, in accordance with an embodiment.

FIG. 9 illustrates a flow diagram of a method 900 of integrating application programming interfaces (APIs) for use in networked environments. The method 900 may be performed by a service (e.g., an API management service) executing machine-readable software code, though it should be appreciated that the various operations may be performed by one or more computing devices and/or processors. At step 905, a service may receive a request to add an API. The request may identify information defining the API to be added to a network environment. The request may identify a domain (e.g., an application or function type) for the API. The information may be generated from data inputted onto a dashboard interface.

At step 910, the service may identify a policy for the API domain from a set of domains. Upon receipt, the service may parse the request to identify the domain associated with the API. The service may select the policy from a set of policies associated with the domain. Each policy may specify a set of rules for validating the API and performance criterion for the API to be approved for addition to the network environment. At step 915, the service may determine whether the API is validated in accordance with the policy. The service may run a validation test on the API in accordance with the set of rules of the policy for validation. At step 920, if the API is determined to be validated, the service may determine whether the API is properly functioning. The service may run a performance test on the API in accordance with the set of rules of the policy for performance.

At step 925, when the API is determined to be validated and to be properly functioning, the service may generate an indication of approval for use. The service may perform on-boarding and integration of the API to the network environment, by permitting applications and services in the network environment to invoke functions defined by the API. At step 930, when the API is determined to be not validated or not properly functioning, the service may generate an indication of disapproval for use. The service may also restrict the API from use in the network environment. At step 935, the service may provide feedback on the API based on the indication. The feedback may include the indication of approval or disapproval of the API. The service may also generate the feedback to include which rules the API was not compliant with.

Figure 10:
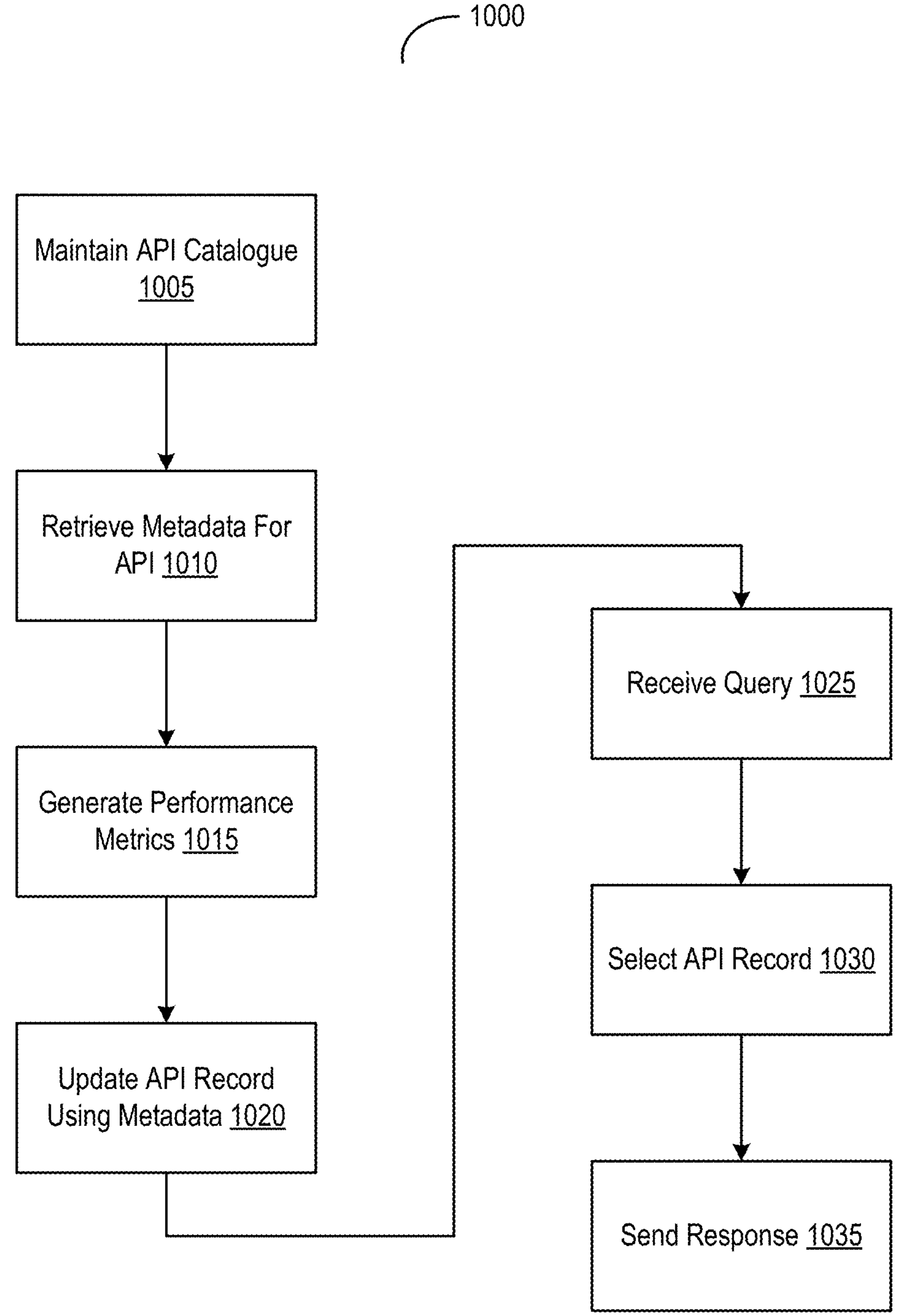
FIG. 10 illustrates a flow diagram of a method of cataloguing application programming interfaces (APIs) using metadata, in accordance with an embodiment.

FIG. 10 illustrates a flow diagram of a method 1000 of cataloguing application programming interfaces (APIs) using metadata. The method 1000 may be performed by a service (e.g., an API management service) executing machine-readable software code, though it should be appreciated that the various operations may be performed by one or more computing devices and/or processors. At step 1005, a service may maintain an API catalogue. The API catalogue may include a set of API records for a corresponding set of APIs. Each record may contain information associated with the API, such as the specification, metadata, and domain, among others. The information may be standardized across each associated domain in accordance with a template for the catalogue.

At step 1010, the service may retrieve metadata for each API on the API catalogue. Once the API is integrated into a defined network environment, the service may monitor for the metadata for the API from various sources, such as the clients, servers, and applications in the network environment, the administrator of the network or APIs, and the API management platform, among others. The metadata may indicate usage of the API within the network environment. At step 1015, the service may generate performance metrics based on the usage of the API within the network environment. The performance metrics may include, for example, request rates, response time, latency, throughput, error rates, availability, and downtime, among others. At step 1020, the service may update the API record using the metadata retrieved for the API. The service may update the API to include performance metrics, classification, version deprecation, and redundancies, among others.

At step 1025, the service may receive a query to find APIs from the API catalogue. The query may include one or more keywords. The query may identify a domain associated with the API. Upon receipt, the service may parse the query to extract or identify the keywords. At step 1030, the service may select one or more API records from the API catalogue using the keywords of the query. The service may search the API catalogue to find API records corresponding to the keywords. At step 1035, the service may send a response to identify the API records corresponding to the keywords. The service may include information about the API (e.g., API specification, metadata, performance metrics) in the response.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of integrating application programming interfaces (APIs) for use in network environments, comprising:

receiving, by a service, from an administrator device, a request to deploy an API for use in a network environment among one or more applications, the request comprising: (i) a type of application associated with a functionality of the one or more applications for which the API is to be deployed for use, the one or more applications hosted on one or more servers in the network environment, the API configured to facilitate communications among the one or more applications, and (ii) a specification defining the API according to a template of a plurality of templates for the type of application;

identifying, by the service, responsive to receiving the request, the type of application associated with the functionality of the one or more applications, the specification, and the template with which the specification is generated;

selecting, by the service, from a plurality of domains corresponding to the plurality of templates, a domain for which to validate the specification, based on the type of application associated with the functionality of the one or more applications and the template with which the specification is generated;

identifying, by the service, from a plurality of policies corresponding to the plurality of domains, a policy based on the domain, the policy defining (i) information to be included in the specification of the API for the type of application and (ii) a functionality criterion to be satisfied by the API for the type of application;

executing, by the service, a performance test on the API to determine that the API satisfies the functionality criterion;

determining, by the service, that the specification defining the API is validated based on identifying that the specification includes the information and the API satisfies the functionality criterion as defined by the policy for the domain;

generating, by the service, an indication of approval of the API for use in the network environment among the one or more applications, responsive to determining that the specification defining the API is validated;

storing, by the service, on a database, an association between the specification of the API and the indication of approval; and permitting, by the service, use of the API for the one or more applications hosted on the one or more servers in the network environment based on storage of the association.

2. The method of claim 1, further comprising:

determining, by the service, that a second API is not validated in accordance with the policy for the domain;

generating, by the service, a second indication of disapproval of the second API for use in the network environment among the one or more applications, responsive to determining that the second API is not validated; and storing, by the service, on the database, an association between the second API and the second indication of disapproval to restrict use of the second API in the network environment.

3. The method of claim 2, further comprising providing, by the service, for presentation via a user interface on the administrator device, the second indication of disapproval of the second API for use in the network environment among the one or more applications.

4. The method of claim 2, wherein determining that the second API is not validated further comprises determining the second API is not validated in accordance with at least one of a subset of policies for the domain, and further comprising identifying, by the service, from the subset of policies, a second policy under which the API is not validated, while the API is validated under a remainder of the subset of policies, and wherein generating the second indication further comprises generating the second indication identifying the second policy under which the API is not validated.

5. The method of claim 1, further comprising providing, by the service, for presentation on the administrator device, a user interface comprising a plurality of user interface elements to accept information for defining the API in accordance with the template for the domain, and wherein receiving the request further comprises receiving the request including the specification generated using the information accepted via one or more of the plurality of user interface elements of the user interface presented on the administrator device.

6. The method of claim 1, wherein determining that the API is validated further comprises determining that the API is validated in accordance with one or more of a subset of policies for the domain, responsive to a request to validate from the administrator device, and wherein generating the indication further comprises generating a validation score based determining that the API is validated in accordance with one or more of the subset of policies.

7. The method of claim 1, further comprising providing, by the service, for presentation via a user interface on the administrator device, the indication of approval of the API for use in the network environment among the one or more applications.

8. The method of claim 1, further comprising maintaining, by the services, on the database, a plurality of templates for the corresponding plurality of domains to define APIs, each domain of the plurality of domains defining a respective type of application for the APIs.

9. The method of claim 1, further comprising performing, by the service, an integration on the API to be used by the one or more applications of the network environment, responsive to storing the association on the database.

10. A system for integrating application programming interfaces (APIs) for use in network environments, comprising:

a service having one or more processors coupled with memory, configured to:

receive, from an administrator device, a request to deploy an API for use in a network environment among one or more applications, the request comprising: (i) a type of application associated with a functionality of the one or more applications for which the API is to be deployed for use, the one or more applications hosted on one or more servers in the network environment, the API configured to facilitate communications among the one or more applications, and (ii) a specification defining the API according to a template of a plurality of templates;

identify, responsive to receiving the request, the type of application associated with the one or more applications, the specification, and the template with which the specification is generated;

select, from a plurality of domains corresponding to the plurality of templates, a domain for which to validate the specification, based on the type of application associated with the functionality of the one or more applications and the template with which the specification included in the request is generated;

identify, from a plurality of policies corresponding to the plurality of domains, a policy based on the domain, the policy defining (i) information to be included in the specification of the API and (ii) a functionality criterion to be satisfied by the API for the type of application;

execute a performance test on the API to determine that the API satisfies the functionality criterion;

determine that the specification defining the API is validated based on identifying that the specification includes the information and the API satisfies the functionality criterion as defined by the policy for the domain;

generate an indication of approval of the API for use in the network environment among the one or more applications, responsive to determining that the specification defining the API is validated;

store, on a database, an association between the specification of the API and the indication of approval; and permit use of the API for the one or more applications hosted on the one or more servers in the network environment based on storage of the association.

11. The system of claim 10, wherein the service is further configured to: determine that a second API is not validated in accordance with the policy for the domain;

generate a second indication of disapproval of the second API for use in the network environment among the one or more applications, responsive to determining that the second API is not validated; and store, on the database, an association between the second API and the second indication of disapproval to restrict use of the second API in the network environment.

12. The system of claim 11, wherein the service is further configured to provide, for presentation via a user interface on the administrator device, the second indication of disapproval of the second API for use in the network environment among the one or more applications.

13. The system of claim 11, wherein the service is further configured to:

determine that the second API is not validated in accordance with at least one of a subset of policies for the domain, and identify, from the subset of policies, a second policy under which the API is not validated, while the API is validated under a remainder of the subset of policies, and wherein generating the second indication further comprises generating the second indication identifying the second policy under which the API is not validated.

14. The system of claim 10, wherein the service is further configured to:

provide, for presentation on the administrator device, a user interface comprising a plurality of user interface elements to accept information for defining the API in accordance with the template for the domain, and receive the request including the specification generated using the information accepted via one or more of the plurality of user interface elements of the user interface presented on the administrator device.

15. The system of claim 10, wherein the service is further configured to:

determine that the API is validated further comprises determining that the API is validated in accordance with all of a subset of policies for the domain, and generate a validation score based determining that the API is validated in accordance with one or more of the subset of policies.

16. The system of claim 10, wherein the service is further configured to provide, for presentation via a user interface on the administrator device, the indication of approval of the API for use in the network environment among the one or more applications.

17. The system of claim 10, wherein the service is further configured to maintain, on the database, a plurality of templates for the corresponding plurality of domains to define APIs, each domain of the plurality of domains defining a respective type of application for the APIs.

18. The system of claim 10, wherein the service is further configured to perform an integration on the API to be used by the one or more applications of the network environment, responsive to storing the association on the database.

* * * * *